US009273750B2

(12) United States Patent
Cuce et al.

(10) Patent No.: US 9,273,750 B2
(45) Date of Patent: Mar. 1, 2016

(54) HYDRAULIC DAMPER INCLUDING HINGEDLY CONNECTED PLUG ELEMENTS FOR QUICK RETURN TO STARTING POSITION

(76) Inventors: Giorgio Cuce, Leghorn (IT); Antonio Cuce, Leghorn (IT); Claudio Ermini, Siena (IT)

( * ) Notice: Subject to any disclaimer, the term of this patent is extended or adjusted under 35 U.S.C. 154(b) by 238 days.

(21) Appl. No.: 14/115,175
(22) PCT Filed: May 3, 2012
(86) PCT No.: PCT/IB2012/052229
§ 371 (c)(1),
(2), (4) Date: Dec. 9, 2013
(87) PCT Pub. No.: WO2012/156854
PCT Pub. Date: Nov. 22, 2012

(65) Prior Publication Data
US 2014/0084597 A1 Mar. 27, 2014

(30) Foreign Application Priority Data
May 3, 2011 (IT) ................................. PI2011A0052

(51) Int. Cl.
*F03B 13/00* (2006.01)
*F16F 13/00* (2006.01)
(Continued)

(52) U.S. Cl.
CPC ............... *F16F 13/007* (2013.01); *B63B 21/00* (2013.01); *B63B 21/20* (2013.01); *B63B 21/50* (2013.01);
(Continued)

(58) Field of Classification Search
CPC ........ B63B 21/00; B63B 21/20; B63B 21/50; B63B 21/56; F03G 7/00; F16F 13/007; F16F 9/19; F16F 9/3405; F16F 9/348
See application file for complete search history.

(56) References Cited
U.S. PATENT DOCUMENTS 4,228,741 A * 10/1980 Bruner .................... B61F 5/245
105/198.3
(Continued)

FOREIGN PATENT DOCUMENTS

DE 102008042822 A1 4/2010
DE 102009006702 A1 8/2010

OTHER PUBLICATIONS

International Search Report mailed Mar. 5, 2013, corresponding to PCT/IB2012/052229.

*Primary Examiner* — Tulsidas C Patel
*Assistant Examiner* — S. Mikailoff
(74) *Attorney, Agent, or Firm* — Ladas & Parry LLP

(57) ABSTRACT

A hydraulic damper (100) comprises a cylinder (10) with a bottom wall (11), a head wall (12) and side walls (13) that define a damping chamber (15) containing a damping fluid (17); in the damping chamber (15) a piston (20) slides with a first face (20a) and a second face (20b) opposite to each other. In particular, the piston (20) defines a first chamber (21) and a second chamber (22) separate from each other and is integral to a shaft (25) with an external connection end (36). The piston (20) is suitable for carrying out a forward stroke (A), between a first dead point (BDP), towards a second dead point (TDP) and a back stroke (B) between the second dead point (TDP) and the first dead point (BDP). In particular, the piston (20) comprises a plurality of permanent holes (33) suitable for permanently connecting the first chamber (21) and second chamber (22) and a plurality of apertures (26) associated each to a plurality of plug elements (37) pivotally connected by connection means (40), on a face of the piston (20) at the apertures (26). The plug elements (37) are suitable to pass spontaneously from a closed configuration (C), in which they close the apertures (26) and allow the leakage of the damping fluid (17) through the plurality of permanent holes (33), in order to damp the movement of the piston (20), to an open configuration (D), in which they open the apertures (26) and allow the free passage of the damping fluid (17) between the first (21) and second chamber (22) allowing a substantial passage of the damping fluid (17) between the first (21) and second chamber (22), in order to reduce the time that takes the piston (20) in the return stroke to return to the starting position BDP.

15 Claims, 15 Drawing Sheets

(51) Int. Cl.
  *B63B 21/00* (2006.01)
  *F16F 9/34* (2006.01)
  *B63B 21/20* (2006.01)
  *B63B 21/50* (2006.01)
  *B63B 21/56* (2006.01)
  *F03G 7/00* (2006.01)
  *F16F 9/19* (2006.01)
  *F16F 9/348* (2006.01)

(52) U.S. Cl.
  CPC . *B63B 21/56* (2013.01); *F03G 7/00* (2013.01); *F16F 9/19* (2013.01); *F16F 9/3405* (2013.01); *F16F 9/348* (2013.01)

(56) References Cited

U.S. PATENT DOCUMENTS

| | | | |
|---|---|---|---|
| 4,718,330 A * | 1/1988 | Mitton | F15B 15/1428 137/491 |
| 4,718,690 A | 1/1988 | Baker | |
| 6,193,029 B1 | 2/2001 | Crawley et al. | |
| 8,292,274 B2 * | 10/2012 | Adoline | F16F 9/0218 267/168 |
| 8,841,786 B2 * | 9/2014 | Tucker | F01C 1/103 290/1 R |
| 9,000,602 B2 * | 4/2015 | Yamada | F03C 1/0623 290/1 R |
| 2004/0069581 A1 * | 4/2004 | Shinata | F16F 9/348 188/322.15 |
| 2004/0222579 A1 * | 11/2004 | Adoline | F16F 9/0218 267/250 |
| 2006/0070834 A1 | 4/2006 | Kanno et al. | |
| 2006/0237274 A1 * | 10/2006 | Hsia | B62K 25/286 188/316 |
| 2006/0249341 A1 | 11/2006 | Chang | |
| 2007/0194506 A1 * | 8/2007 | Adoline | F16F 13/007 267/168 |
| 2009/0107783 A1 | 4/2009 | Ota | |
| 2010/0038197 A1 * | 2/2010 | Liang | E05F 5/10 188/322.15 |
| 2010/0101474 A1 | 4/2010 | McEvoy et al. | |
| 2010/0123276 A1 * | 5/2010 | Adoline | F16F 13/007 267/69 |
| 2011/0084503 A1 * | 4/2011 | Li | B60G 17/019 290/1 R |
| 2011/0247906 A1 * | 10/2011 | Morita | F16F 9/3405 188/280 |
| 2012/0018264 A1 * | 1/2012 | King | F16F 9/348 188/282.1 |
| 2012/0234639 A1 * | 9/2012 | Teraoka | F16F 9/5126 188/280 |
| 2013/0147205 A1 * | 6/2013 | Tucker | F01C 1/103 290/1 A |
| 2013/0154280 A1 * | 6/2013 | Tucker | F01C 1/103 290/1 R |
| 2015/0233113 A1 * | 8/2015 | Ueno | E04B 1/98 52/167.1 |

* cited by examiner

HYDRAULIC DAMPER INCLUDING HINGEDLY CONNECTED PLUG ELEMENTS FOR QUICK RETURN TO STARTING POSITION

FIELD OF THE INVENTION

The present invention relates to the field mechanical and, in particular it relates to a hydraulic damper suitable for damping external actions, in particular push or pull actions.

For example, the damper can be applied in the nautical field arranged in moorings of watercrafts, for example yachts, ships or other types of watercrafts, but also in auto-motive field or other fields. With the term action it is meant a whichever action that generates a push or pull action.

BACKGROUND OF THE INVENTION

Different types of hydraulic dissipators or dampers are known, also commonly called viscous dissipators.

In particular, a type of viscous dissipator is a cylinder-piston mechanism capable of damping the movement transferred to it by means of viscous friction. The viscous force with which the dissipator reacts to the action is proportional to the speed and has an opposite direction to the input force. Such device is often used in combination with an elastic element, in particular a spring.

More in particular, the piston that slides in the cylinder defines a first and a second chamber separate from each other, in such a way that during the stroke of the piston there is a leakage of the viscous fluid between the first and the second chamber.

In order to obtain the leakage that determines the rate of dissipation of the damper, dedicated fixed passages are provided, or valves, on the piston. These are represented, for example, by holes with minimum diameter that damp the leakage of the fluid from a chamber to the other and then determine the dissipation.

A further example provides instead the presence of valve elements suitable to pass from a more open configuration to a more closed configuration changing the damping force.

However the above described hydraulic dampers are not effective if they have to dissipate or damp a plurality of actions temporally close to each other. It emerged, in fact, that the leakage of the viscous fluid through the valve means affects both the forward stroke both the back stroke of the piston. Therefore, the piston takes substantially the same time to go back to a starting position as the forward stroke.

In addition, such types of dissipators are not capable to have a horizontal position, or inclined, since in this case the valve element cannot return spontaneously to the starting position.

It is desirable, for example in the nautical field, to have dampers suitable for damping the actions caused by waves on a watercraft. To this end, spring damping devices are known, as described in WO9006453A1, or with resilient rubber elements, as described in WO03106251A1, arranged between two portions of a mooring, suitable for damping movements of the watercraft, caused by waves, when the watercraft is moored, for example, in a harbour.

On the other hand, the use of other damping systems different from those above cited would not be suitable to this object, since the viscous dampers of known type are not capable of dissipating actions that are temporally close to each other, like a movement caused by waves. In fact, according to the principle of operation of the above described shock absorbers, a movement of the watercraft away from the point of mooring, causes mooring ropes to be pulled abruptly and damped by the shock absorber, in order not to cause back stroke to the watercraft and negatively affecting the comfort of the passengers. However, the cylinder-piston mechanism if subject to pulling forces close to each other, owing for example to a succession of waves that displace the watercraft, once done a forward stroke and arrived to the second dead point of the damper, after damping a first wave, requires a time substantially equal for carrying out the back stroke and returning to the first dead point of the damper.

Therefore, in case of waves temporally close to each other the shock absorber loses progressively its function damping correctly the waves only if they are regularly paced. More in particular, the piston that slides in the cylinder, after having damped the first wave, starts to carry out the back stroke, and if a second wave arrives close to the first, the piston will be located in an intermediate position between the second dead point and the first dead point of the damper, thus reducing remarkably its damping effectiveness. In particular, for a succession of waves very close the shock absorber it can lose almost completely its damping effectiveness.

DE102008042822A1 describes an hydraulic damper of viscous type, with adjustable viscous resistance. The shock absorber also comprises plugs on the head of the piston in the form of leaf springs, which are foldably connected to a fastening point. Such plugs, if they were subject to high deformation elevate, would have the drawback of a quick wear and then break. In any case, such an hydraulic damper would not solve the problem of a quick back stroke, as it would be desirable in case of shock absorbers for watercrafts.

In case of shock absorbers for damping the effect of the waves on watercrafts moored in a harbour, as well as for other applications, it would be also desirable to exploit the energy accumulated by the shock absorbers for generating electric energy, for example for recharging batteries on wharfs or on watercrafts, or for any other use.

SUMMARY OF THE INVENTION

It is therefore an object of the present invention to provide a hydraulic damper that allows to overcome the drawbacks of the dampers of prior art and permits to genedamping rate actions temporally close to each other.

It is another object of the present invention to provide a structure of hydraulic damper that allows to be located in whichever angular position, in particular a vertical position, horizontal or inclined.

It is also object of the present invention to provide a structure of hydraulic damper that allows to be easily removed for carrying out maintenance operations.

It is still another object of the present invention to provide a hydraulic damper that is structurally easy and cheap to make and that is reliable with time.

It is a particular object of the present invention to provide a hydraulic damper which can be fixed to a mooring of a watercraft that allows to damp all the actions owing to waves when this is moored in a harbour or in open sea.

It is still an object of the present invention to provide a structure of hydraulic damper that may be mounted as retrofit both on the watercrafts and on a wharf-sided support, for example in a harbour.

It is further object of the present invention to provide a structure of hydraulic damper that allows to be used immersed in water for mooring of watercrafts or floating wharfs.

It is also object of the present invention to provide a structure of damper that allows to exploit the accumulated damping energy for generating electric energy, for example for recharging of batteries on the watercrafts, to provide energy at the wharfs, or for any other use.

These and another objects are accomplished by a structure of hydraulic damper comprising:

- a cylinder having a bottom wall, a head wall and side walls that define a damping chamber having an inner lateral surface;
- a piston having a first face and a second face opposite to each other suitable for sliding within said damping chamber along said inner lateral surface, in order to define a first and a second chamber separate from each other, said piston being suitable for carrying out a forward stroke between a first dead point at said bottom wall, towards a second dead point at said head wall, and a back stroke between said second dead point and said first dead point;
- a shaft integral to said piston that extends outside beyond said head wall of said cylinder, in order to define an external connection end;
- a damping fluid contained in said damping chamber;

wherein said structure of hydraulic damper comprises:

- a plurality of permanent holes suitable for permanently connecting said chambers and allowing leakage of said damping fluid;
- a plurality of apertures that extend from said first face to said second face of said piston;
- wherein said plurality of apertures are associated to a plurality of plug elements pivotally connected by a connection means, on said first face or on said second face of said piston,
- in such a way that said plug elements move spontaneously from a closed configuration, in which said apertures are closed and allow the leakage of said damping fluid between said first and second chambers only through said plurality of permanent holes, in order to damp the movement of said piston towards said second dead point,
- to an open configuration, in which they open said apertures and allow the free passage of said fluid between said first and second chambers assisting the return movement towards said first dead point.

This way, through the combination between the plurality of permanent holes and the apertures with the relative plug elements, it is possible to obtain a configuration damping wherein the plug elements close the apertures and the damping fluid passes only through the plurality of holes causing a dissipation or damping proportional to the square of the speed with which the piston moves, to the number and to the diameter of the holes and to the characteristics of the fluid, besides other factors. On the other hand, when the piston moves in an opposite direction, the plug elements are open allowing a substantial free passage of the damping fluid between the two chambers, in order to reduce the time that takes the piston in the return stroke to the starting position. This way, in case of temporally close actions, the damper can damping every single action, since the piston returns quickly towards a starting position and is again in position ready for damping a following action.

In particular, said plug elements are arranged on said first face, in order to keep said closed configuration during said forth stroke, and pass to said open configuration in said back stroke. This way, the damper is capable of dissipating pulling forces or actions applied at said connection end.

Alternatively, said plug elements are arranged on said second face, in order to keep said closed configuration during said back stroke, and pass to said open configuration, in said forth stroke. This way, the damper is capable of dissipating forces or pushing actions applied at said connection end.

Advantageously, said connection means allows the rotation of each plug element according to a rotation axis parallel to the first face or second face of said piston and comprises:

- a connecting arm having a first connection end integral to said plug element and a second connection end protruding from said plug element;
- a fastening element suitable for receiving said second connection end and enabling the rotation about said axis.

More in particular, said second connection end is T-shaped and said fastening element defines a housing in which said second T-shaped end is inserted in order to allow a free rotation.

Alternatively, said second end has a hole in which a pin engages for the pivotal connection to said fastening element.

In a further alternative embodiment, said fastening element is suitable for receiving the second connection end of two opposite plug elements. In particular, said second end is L-shaped, so that the two connecting arms of two opposite plug elements are the same and rotate with respect to said fastening element about a longitudinal shaft portion of said L-shaped end. This way, said longitudinal shaft portion works as abutment to limit the rotation of each plug element Advantageously, said permanent holes are made directly on said piston and extend from said first face to said second face.

Alternatively or in combination, said permanent holes are made directly on each or on a part of said plug elements.

Preferably, said plug elements have a minimum thickness with respect to the thickness of said piston defined between said first face and said second face. This way, the minimum thickness causes the fluid, leaking through the plurality of holes made on each plug element, to have a turbulent flow of the fluid to reach a better damping coefficient. In other words, the effects of a laminar flow of the damping fluid in the passage from a chamber to the other are avoided, that would reduce the dissipation of the damper.

In particular, said plurality of apertures on the piston define an overall opening area at least double with respect to the overall opening area defined by said plurality of permanent holes, in particular said overall opening area of said apertures is at least four times higher with respect to the overall opening area of said permanent holes. This way, the substantial difference between the diameter of the apertures and the diameter of the permanent holes allows a quick back stroke of the piston towards the starting position, since it allows a free passage of the damping fluid between the first and the second chamber.

In particular, said damper provides an elastic element, in particular a spring, mounted to said shaft suitable for assisting the damping of the movement of said piston and the back stroke of said piston to the starting position. This way, the spring allows to damp completely the actions that have low frequency and speed, like those caused by a long wave, and also it is provided damp the high frequency actions acting in combination with the permanent holes of the piston.

Preferably, said spring is mounted between a first and a second cup-shaped element arranged opposite to each other, wherein said first cup-shaped element is integral to said shaft and said second cup-shaped element is arranged free at an end opposite to said spring and is located between said spring and said head wall of the cylinder. This way, the spring is inserted in the first cup-shaped element integral to the piston and the second cup-shaped element is then mounted. When the head wall of the cylinder is arranged, the second cup-shaped element abuts against the head wall of the cylinder, in order to precharge the spring. This way, it is then particularly easy and practical to replace or repair the spring since the second cup-shaped element once removed the head wall of the cylinder is free from the shaft. Alternatively, the spring can contact directly the piston, omitting the first cup-shaped element from the side of the piston, in order to reduce the longitudinal size of the damper. At the opposite side, instead of the second cup-shaped element an interposition washer can be provided.

In a possible embodiment, the spring has outer diameter equal to the inner diameter of the cylinder, and has ends that contact directly the piston and on the plug of the cylinder, or on an interposition washer.

Advantageously, coaxially to the shaft, a sleeve of resilient material is provided, suitable for absorbing energy in case of excessive compression of the spring, which could lead to a total elongation of the same. In this case, the sleeve of resilient material would absorb part of the load of the spring, preventing it from a total elongation. In particular, the sleeve of resilient material is of rubber material, for example a tubular portion of rubber. Alternatively, the sleeve of resilient material is a further spring.

In an advantageous embodiment, the spring is of adjustable pitch type. In this case, the stiffness of the spring is variable responsive to the elongation of the damper, with a growing absorbed load responsive to the elongation. This way, the hydraulic damping is effective also in case of low intensity and frequent loads.

In particular, each plug element comprises a frustum-conical portion suitable for engaging tightly with a respective opening on the piston so that said frustum-conical portion penetrates partially within said opening and does not allow the passage of the damping fluid during the movement of the piston towards said second dead point. Alternatively, each plug element has cylindrical shape, or any other form.

In particular, for adjusting the flow of damping fluid and then the dissipation of the damper, said permanent holes are associated to further closure elements suitable for blocking one or more through holes. This way, closing selectively one or more of the through holes it is possible to adjust the damping rate and then to obtain more or less damping effectiveness.

The characteristic size of the damper is function of the specific application to which it is destined. For example, in the nautical field, the size of the damper and then its damping capacity, is function of the size of the watercraft.

In particular, said damper can be used in a position selected among:
vertical;
horizontal;
inclined.

Advantageously, in said horizontal position and in said inclined position each connection means defines a hinge that is arranged superiorly with respect to the centre of gravity of a corresponding plug element, in particular the centre of gravity of the plug element is misaligned with respect to the hinge in such a way that the plug element returns spontaneously to said closed configuration. This way, the closing movement of the plug element is triggered by a component of the weight force that arises from said misalignment between the centre of gravity and the hinge of the plug element on the piston.

In a preferred embodiment, said damper comprises in combination with said spring, a magnetic element arranged on said bottom wall opposite to said plug elements, in such a way that when said piston is located substantially at said first dead point, said magnetic element generates an attraction on said piston and on said plug elements, inversely proportional to the square of the distance, which assists the passage of said plug elements to the closed configuration, whereas when said piston moves towards said second dead point said magnet also damps the movement of said piston. This way, the damper can be used also in an overturned position since closing the plug elements is ensured by said magnetic element.

More in particular, said damper comprises alternatively to said spring a first and a second magnetic elements arranged opposite to each other having polarity opposite to each other.

In particular, said damper is configured to be arranged on a wharf-sided mooring support of a harbour or on a watercraft to be connected, through said external connection end, to a mooring for damping the actions on the watercraft or the wharf transmitted to said mooring. In a preferred embodiment, two dampers are provided arranged below said wharf-sided mooring support to which the watercrafts are moored, each damper arranged within a support frame that defines a housing.

Alternatively, the support frame of the damper is configured to be arranged directly on the watercraft and can contain a damper that is sized responsive to the size of the watercraft on which it is arranged. In this case, it is possible to reduce the overall costs of the damper since the used materials for the external parts must not have the same resistance to corrosion with respect to an application for outdoor appliances, in particular in contact with sea water.

In more detail, said support frame comprises:
a tubular support having a fastening portion and a lower support ring arranged opposite to said fastening portion, suitable to define an abutment for the head wall of said damper;
a fastening means arranged on said tubular support for keeping said damper integral to said support ring. This way, the damper is inserted into the tubular support up to when the head wall of the cylinder arriabuts against the support ring and blocked by the fastening means that the maintain in contact with the support ring.

Advantageously, said cylinder comprises a first sealing means arranged between an edge of said side wall and said head wall, in particular said head wall comprises from the side that matches with said edge of the cylinder, at least a groove for housing a sealing element, in particular said head wall provides two grooves with respective seals concentric to each other.

More in particular, said head wall comprises a matching portion with said shaft and provides a second sealing means, in particular a gasket, arranged at said matching portion, in particular said second sealing means is located in a housing made within said matching portion, said matching portion providing, furthermore, a removable cover through which it is possible to reach said housing, in order to replace or repair said second sealing means. This way, through the first and second sealing means the damper is tightly sealed in such a way that it can be used dipped in water, for example in sea water, keeping with time the functional characteristics relative to the inner components.

In particular, said second sealing means comprises at least two gaskets in series between which a brass contact surface can be arranged, with guiding function for the shaft. This way, the presence of the brass contact surface provides a guide to the shaft if the piston has not lateral sealing means on the cylinder, and allows also a slight lateral leakage, for ensuring a higher sliding fluency to the cylinder, and less wear.

Preferably, said damper comprises a second connection end integral to the cylinder and made on said bottom wall. In detail, said bottom wall comprises a cross-like element equipped with a connection hole to which it is possible to connect to a ballast resting on the sea depth or to a further mooring. This way, it is possible to connect the damper between two anchoring elements, such as for example, in the nautical field two moorings for anchoring a watercraft or a floating wharf, or between a ballast arranged on the sea depth and a bow mooring or stern mooring of the watercraft or of the floating wharf.

Advantageously, said damper is configured to be arranged between two opposite parts of a frame, for example of a car, for damping the actions given by the relative movement between said parts.

According to another aspect of the invention a structure of wharf-sided mooring support for a watercraft comprises said structure of damper, in particular said damper is housed by means of a support frame, said support frame comprising:
- a tubular support having a fastening portion and a lower support ring arranged opposite to said fastening portion suitable to define an abutment for the head wall of said damper;
- a fastening means arranged on said tubular support for keeping said damper integral to said support ring.

In particular said fastening means comprises a plurality of rods rotationally spaced from each other that define a tubular fastening structure suitable to be arranged within said tubular support, each of said rods having a first end connected to a fastening plate and a second free end suitable for contacting said head wall of the cylinder, in such a way that, when said tubular fastening structure is inserted within said tubular support and said fastening plate is integrally connected to said fastening portion, said rods push on said head wall of the cylinder opposing to its movement, which is caused by the forces that act on the actuating end the shaft. In this case, the damper is arranged within the tubular support in a position substantially vertical.

Alternatively, said damper is arranged in a horizontal position by said tubular support.

Even alternatively, said damper is arranged in horizontal position and is connected to said wharf-sided mooring support or to said watercraft by said second connection end.

In a possible embodiment of the invention, said damper also comprises a generator unit equipped with:
- a rack, integral to said shaft outside of the head wall of said cylinder;
- a generator of electrical energy having a stator integral to a fixed portion of said generator unit, integral to said head wall, and a mobile portion, suitable for engaging with said rack, and causing an armature of said generator to rotate with respect to said stator.

This way it is possible to recover energy from the relative movement of the shaft of the piston with respect to the cylinder. In particular, during the damping step, a part of the energy is dissipated, a part is accumulated by the spring, and a part is recovered by the generator. During the back stroke of the piston, the part of energy accumulated by the spring is also recovered by the generator.

According to another aspect of the invention, a structure of hydraulic damper comprises:
- a cylinder having a bottom wall, a head wall and side walls that define a damping chamber having an inner lateral surface;
- a piston having a first face and a second face opposite to each other suitable for sliding within said damping chamber along said inner lateral surface, in order to define a first and a second chamber separate from each other, said piston being suitable for carrying out a forward stroke A between a first dead point (BDP) at said bottom wall, towards a second dead point (TDP) at said head wall, and a back stroke between said second dead point (TDP) and said first dead point (BDP);
- a shaft integral to said piston that extends outside beyond said head wall of said cylinder, in order to define an external connection end;
- a spring arranged between said head wall and said piston;
- a generator unit comprising:
  - a rack, integral to said shaft outside of the head wall of said cylinder;
  - a generator of electrical energy having a stator integral to a fixed portion of said generator unit, integral to said head wall, and a mobile portion, for engaging with said rack, and causing an armature of said generator to rotate with respect to said stator.

Also In this case, it is possible to recover energy from the relative movement of the shaft of the piston with respect to the cylinder. During the forward stroke of the piston that is close to the head wall, a part of the energy is accumulated by the spring, and a part is recovered by the generator. During the back stroke of the piston, the part of energy accumulated by the spring is completely recovered by the generator.

In particular, a damping fluid can be present contained in said damping chamber. Can be also provided a plurality of permanent holes suitable for permanently connecting said first and second chambers and allowing leakage of said damping fluid. Even in this case there is a double production of energy both in the forward and in the back stroke of the piston.

This type of dampers with generator can be used in an any of the ways shown above, and in particular for dampers mounted to a wharf or pier, or for dampers installed on board of watercrafts.

BRIEF DESCRIPTION OF THE DRAWINGS

Further characteristics and the advantages of the present invention, will be made clearer with the following description of an embodiment thereof, exemplifying but not limitative, with reference to the attached drawings, wherein:

FIG. 1 shows an open configuration of the plug elements that allow reducing remarkably the time of back stroke of the piston to a starting position;

DESCRIPTION OF A PREFERRED EMBODIMENT

Figure 1:
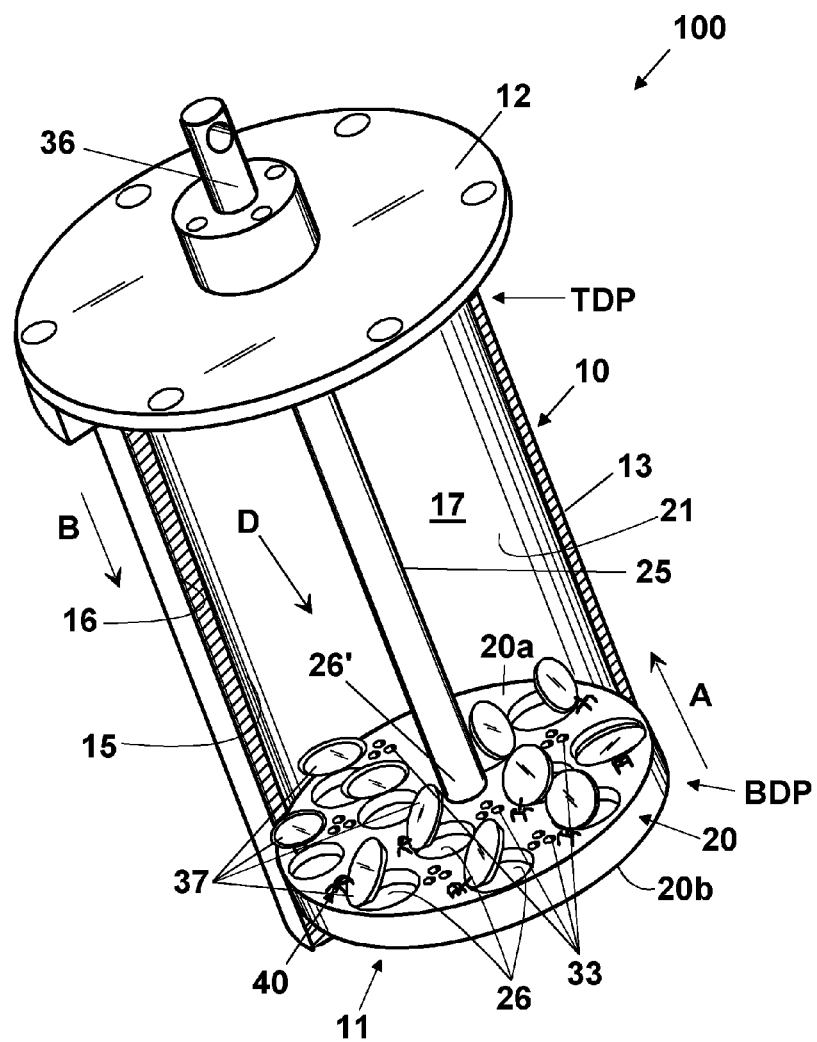
FIG. 1 shows a sectional perspective view of a hydraulic damper, according to the invention, which comprises a cylinder, a piston and a damping fluid, wherein on the piston a plurality of permanent holes of small size and a plurality of apertures with corresponding plug elements are made.

With reference to FIG. 1, a hydraulic damper 100, according to the invention, comprises a cylinder 10 with a bottom wall 11, a head wall 12 and side walls 13 that define a damping chamber 15 with an inner lateral surface 16 suitable for containing a damping fluid 17; in the damping chamber 15 flows, along the inner lateral surface 16, a piston 20 with a first face 20a oriented towards head wall 12, and a second face 20b opposite to the first face 20a. In particular, piston 20 defines a first chamber 21 and a second chamber 22 separate from each other, better shown in FIG. 3, and is integral to an end 26' of a shaft 25 that extends beyond head wall 12 of cylinder 10, in order to define an external connection end 36, opposite to the end 26' integral to piston 20.

According to the principle of operation, piston 20 is suitable for carrying out a forward stroke A, between a first dead point BDP at the bottom wall 11, towards a second dead point TDP at head wall 12, and a back stroke B between the second dead point TDP and the first dead point BDP.

More in particular, piston 20 comprises a plurality of permanent holes 33 that extend from the first face 20a to the second face 20b, suitable for permanently connecting the first chamber 21 and second chamber 22 and allowing leakage of the damping fluid 17 during forward stroke and back stroke B of piston 20. Furthermore, piston 20 comprises a plurality of apertures 26 associated each to a plurality of plug elements 37 pivotally connected by connection means 40, on a face of piston 20 at the apertures 26. Alternatively, plug elements can be provided that close more apertures 26. In particular, the connection means 40 allow the rotation of each plug element 37 according to a rotation axis parallel to a first face 20a or second face 20b of piston 20.

Figure 3:
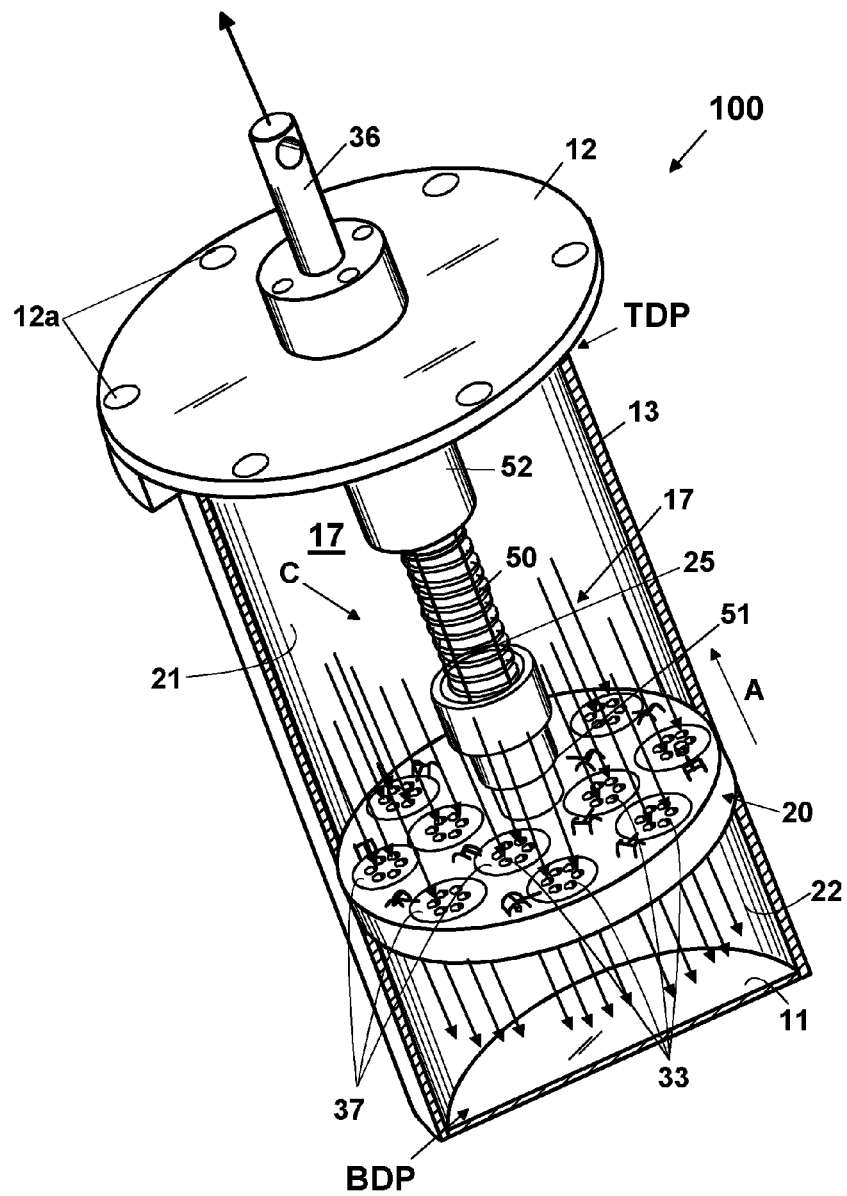
FIG. 3 shows a sectional perspective view of the hydraulic damper depicting an instant time during which the piston carries out the forward stroke and the damping fluid leaks through the only through the permanent holes.
Figure 4:
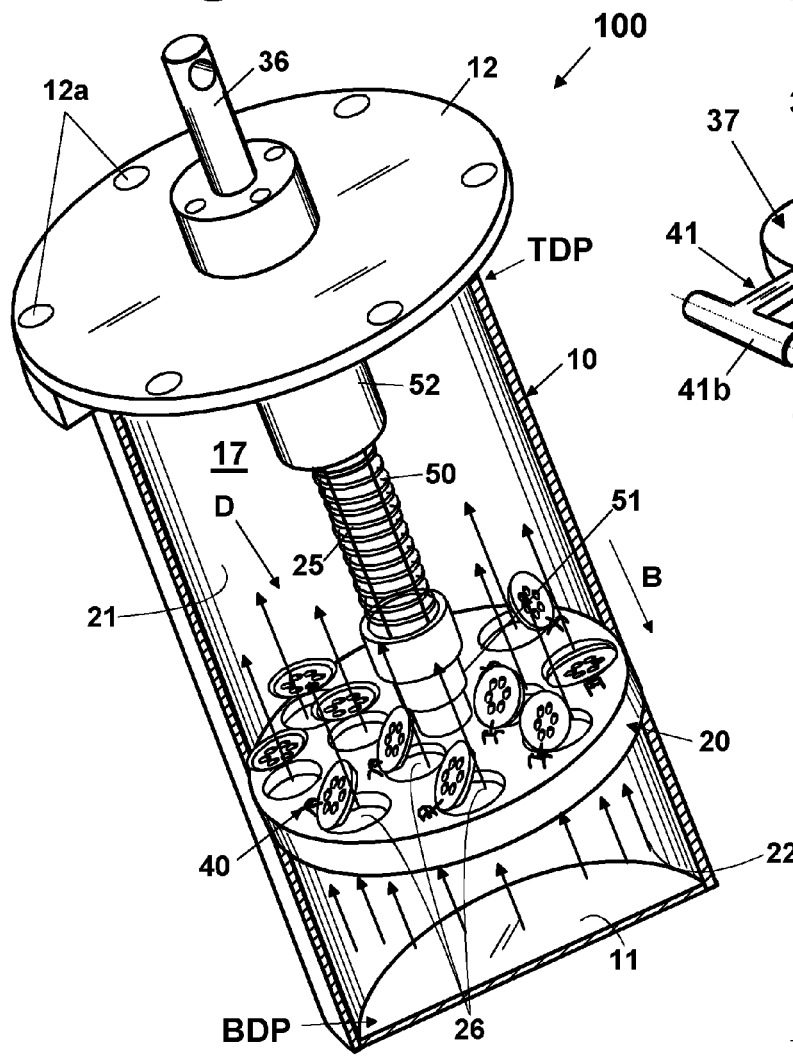
FIG. 4 shows a sectional perspective view of the hydraulic damper depicting an instant time during which the piston carries out a back stroke that causes the spontaneous opening of the plug elements and allows the damping fluid to pass freely through the apertures, in order to reduce the time that takes the piston for the back stroke.

In particular, plug elements 37 are suitable to pass spontaneously from a closed configuration C, (FIG. 2) in which they close the apertures 26 and allow a leakage through the plurality of permanent holes 33 of the damping fluid 17 between first chamber 21 and second chamber 22 (FIG. 3), in order to damp the movement of piston 20, to an open configuration D, (FIG. 1) in which they open the apertures 26 and allow the free passage of the damping fluid 17 between first chamber 21 and second chamber 22 assisting the movement of piston 20 (FIG. 4). This way, when plug elements 37 close the apertures 26, the single permanent holes 33 allow to damp an action applied to the actuating end 36, since the damping fluid 17 passes only through the plurality of holes 33 (FIG. 3) causing a dissipation substantially proportional to the speed with which the piston moves 20, besides other factors. On the other hand, when piston 20 moves in an opposite direction, plug elements 37 are open allowing a substantial passage of the damping fluid 17 between first chamber 21 and second chamber 22, in order to reduce the time that takes piston 20 in the return stroke to the starting position BDP (FIG. 4). This way, in case of temporally close actions or at high frequency, the damper allows to damp every single action, since once damped a first action the return of piston 20 towards the BDP is carried out in a very short time with respect to the forward stroke, i.e. the time used by the piston to reach the TDP. This allows the piston to go back again to starting position for dissipating a following action. An example of actions at high frequency are the wavy movements caused by a plurality of waves temporally close to each other. The damper, as above said, allows then damping every single action caused by each wave since the fast passage of the damping fluid 17 during back stroke B, between the two chambers, allows to piston 20 to go back quickly towards the first dead point BDP for damping the successive wave.

Figure 2:
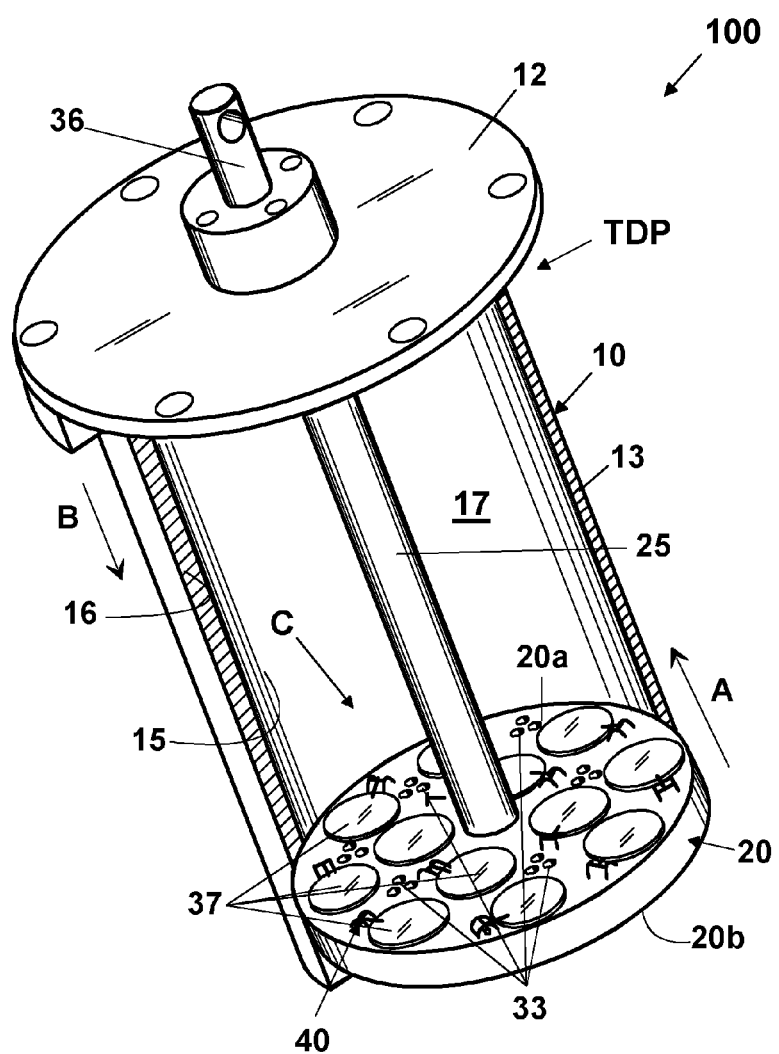
FIG. 2 shows a sectional perspective view of the hydraulic damper of FIG. 1, in a closed configuration of the plug elements, which cause the leakage of the damping fluid through the single permanent holes that allow then damping the movement of the piston during a stroke towards a top dead point.

In particular, as shown in FIGS. 1 and 2, plug elements 37 are arranged on the first face 20a of piston 20, in order to keep the closed configuration C during the forward stroke A, and pass to the open configuration D in back stroke B. This way, the damper is capable of dissipating pulling forces or actions applied to the connection end.

Alternatively, plug elements 37 can be arranged on the second face 20b, in order to keep the closed configuration C during back stroke B, and pass to the open configuration D in the forward stroke A. In this case, the damper is suitable for damping pushing actions.

In one embodiment, as shown in FIG. 3, the through holes 33 are made directly on each plug element 37 and an elastic element is provided, in particular a spring 50, mounted to shaft 25 suitable for assisting the damping action of the movement of piston 20 during forward stroke an and to assist the return of piston 20 to the starting position BDP, during back stroke B. This way, spring 50 allows to damp the actions at a low frequency such as for example caused by a long wave, as well as it contributes damping the actions at high frequency in combination with permanent holes 33.

Figure 3A:
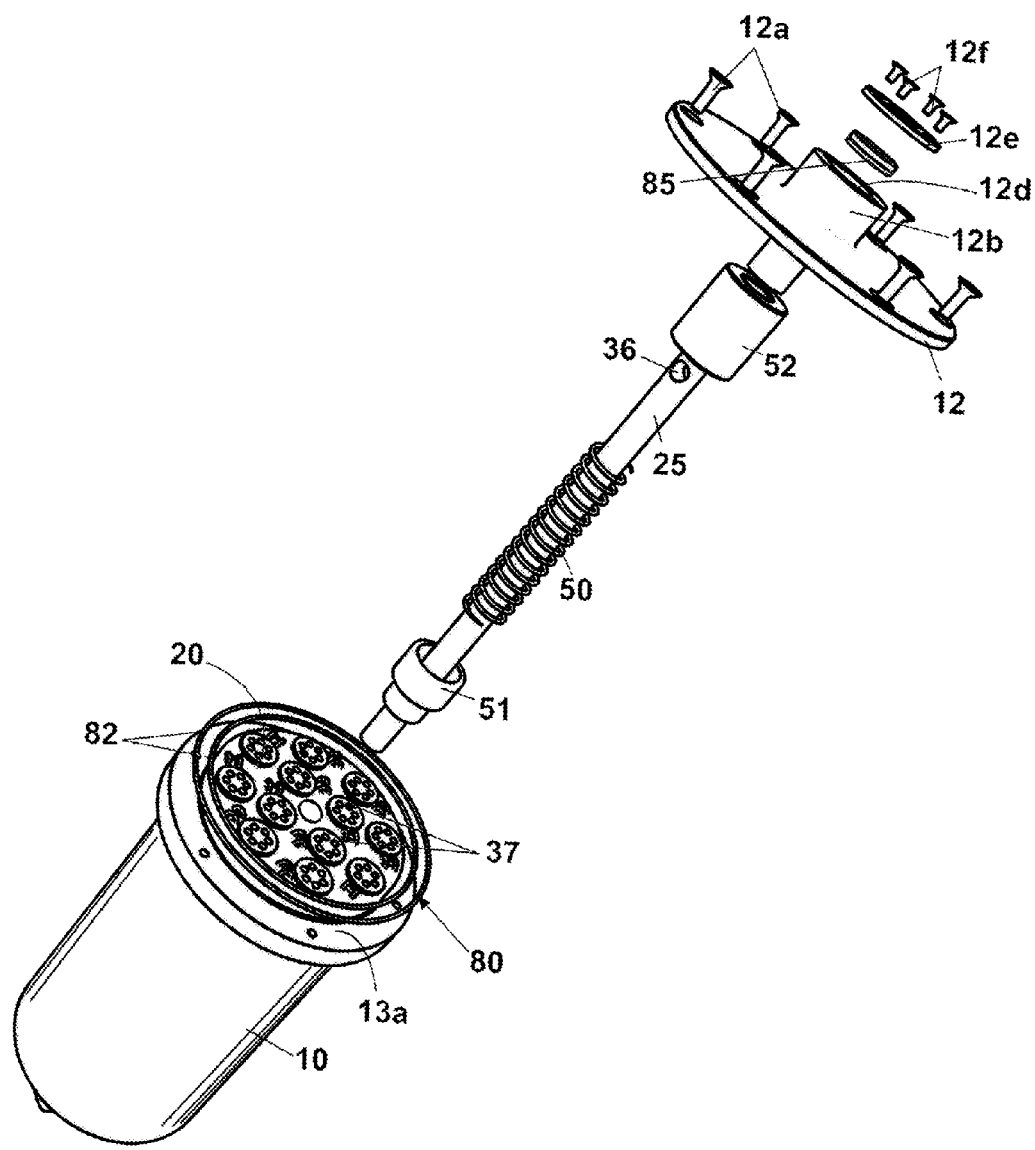
FIG. 3A shows in an exploded perspective view the hydraulic damper with the sealing means arranged for sealing the damping chamber, highlighting the simplicity of assembling/disassembling the many components that allow an easy and practical maintenance and/or change.

In more detail, as shown in the exploded view of FIG. 3A, spring 50 is mounted between a first 51 and a second 52 cup-shaped elements arranged opposite to each other, where the first cup-shaped element 51 is integral to shaft 25 and the second cup-shaped element 52 is arranged free at an end opposite to spring 50 and is located between spring 50 and head wall 12 of cylinder 10. More in particular, head wall 12 of cylinder 10 protrudes outside with respect to cylinder 10 and is connected releasably by a screw 12a. This way, disassembling head wall 12, spring 50 is inserted on shaft 25 up to reaching first cup-shaped element 51 integral to shaft 25. Then on the opposite side the second cup-shaped element 52 is mounted. When head wall 12 of cylinder 10 is assembled again, second cup-shaped element 52, opposite to spring 50, abuts against head wall 12 of cylinder 10. Such a matching allows to pre-charge spring 50, in order to keep it in a correct operation position co-axial to shaft 25 and to increase the efficiency of the damper. It is then particularly easy and practical to replace or repair spring 50; in fact, it is sufficient to disassemble head wall 12, removing the second cup-shaped element 52 and removing spring 50 for changing it with a different spring. This way, it is possible to change the mechanical characteristics of the spring and then of the damper, in order to adapt it to the needs of the users.

Figure 5:
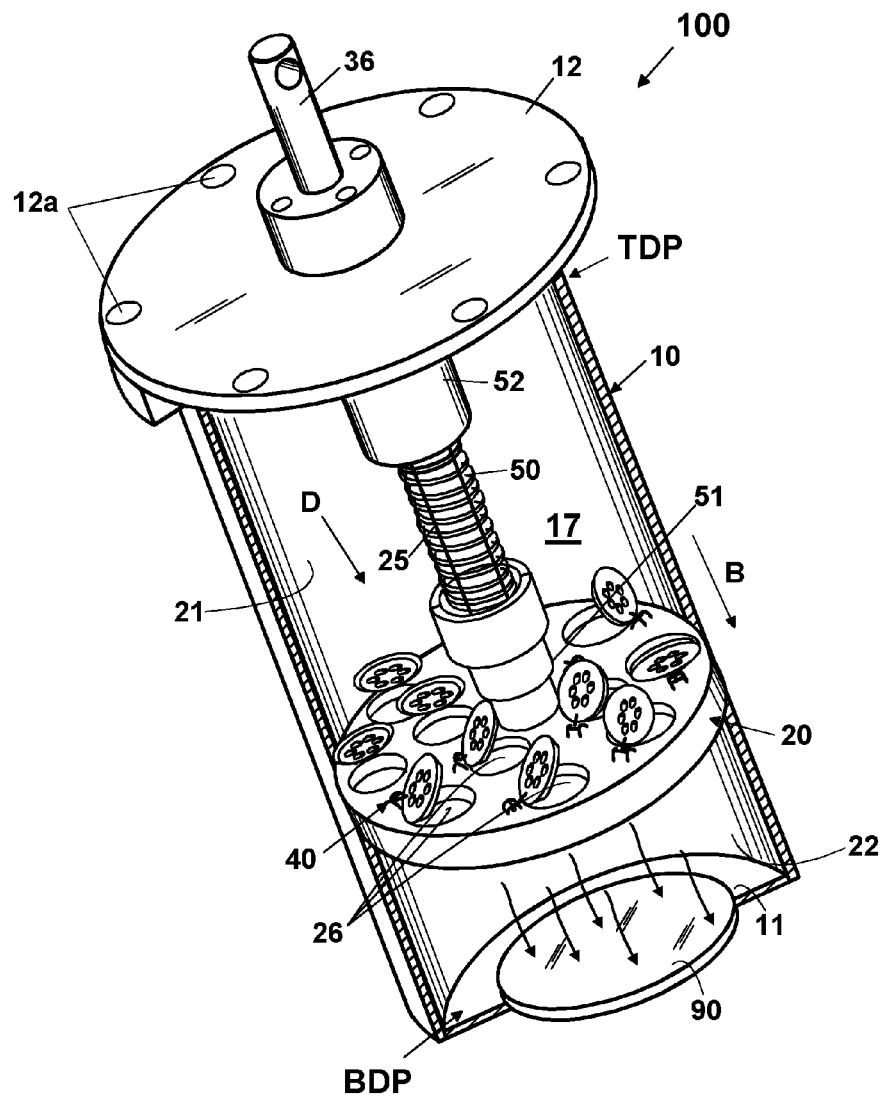
FIG. 5 shows in a sectional perspective view the hydraulic damper equipped with an magnetic element suitable for assisting the damping action of the piston and assisting the closing movement of the plug elements.

Notwithstanding in FIGS. 3 to 5 the spring is indicated arranged between two cup shaped elements, the spring (in a way not shown) can also contact directly the piston, omitting the first cup-shaped element from the side of the piston, in order to reduce the longitudinal size of the damper. At the opposite side, instead of the second cup-shaped element an interposition washer can be alternatively provided. Such washer, as also the second cup-shaped element, is provided for not transmitting possible rotations of the piston, as it can occur in case of use for damping the tensile stress of the mooring ropes of watercrafts.

Advantageously, instead of the cup shaped elements, or in addition to them, a sleeve of resilient material (not shown) can be provided, suitable for absorbing energy in case of excessive compression of the spring, which could lead to the total elongation of the same. In this case, the sleeve of resilient material would absorb part of the load of the spring, preventing it from a total elongation. In particular, the sleeve of resilient material can be of rubber material, for example a tubular portion of rubber. Alternatively, the sleeve of resilient material is a further spring.

Always as shown in FIG. 3A, cylinder 10 comprises a first sealing means 80 arranged between an edge 13a of the side wall 13 and head wall 12. In particular, head wall 12 provides from the side that matches with the edge 13a of cylinder 10, at least a groove, not shown, for housing a sealing element 82; in particular it provides two grooves with respective gaskets 82 concentric to each other.

Figure 10:
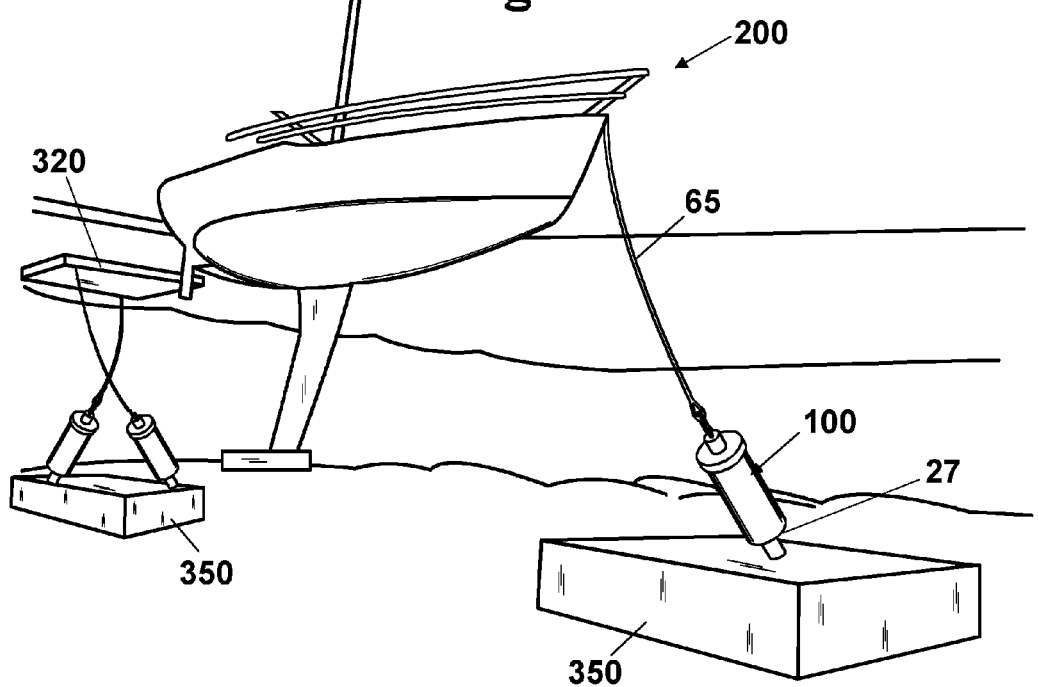
FIG. 10 shows in a perspective view an application of the damper arranged between an bow mooring of a watercraft and a ballast located on the sea depth, furthermore, shows a couple of dampers associated to a floating wharf arranged always on the sea depth.

More in particular, head wall 12 comprises a matching portion 12b with shaft 25 and provides a second sealing means 85, in particular a gasket, arranged at the matching portion 12b. In particular, the gasket 85 is located in a recess 12d made in the matching portion 12b. The matching portion 12d provides, furthermore, a removable cover 12e, connected by means of screws 12f, through which it is possible to reach the housing 12d and to replace the sealing gaskets 85. This way, the damper is tightly sealed in such a way that it can be used immersed in water keeping the own functional characteristics, as shown in FIG. 10.

In a possible embodiment of the second sealing means, not shown, two gaskets 85 can be arranged in series between which a brass contact surface can be arranged, with guiding function for the shaft. This way, the presence of the brass contact surface provides a guide to the shaft even if there are not lateral sealing means between cylinder 13 and piston 20. In this case, a slight lateral leakage is present between cylinder 13 and piston 20, for ensuring a higher sliding fluency in the cylinder, and less wear. The brass contact surface, in cooperation with spring 50, contributes to avoid jamming of the piston with respect to the cylinder.

Figure 4A:
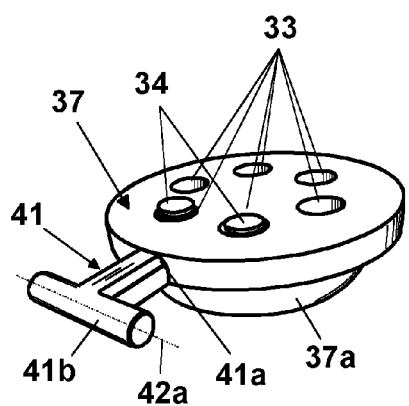
FIG. 4A shows an enlarged view of an plug element that highlights its frustum-conical shape suitable for engaging with the apertures made on the piston.

More in particular, as shown in FIGS. 4 and 4A, plug elements 37 on which permanent holes 33 are made according to a layout substantially circular, have a minimum thickness with respect to the thickness of piston 20, determined as distance between the first face 20a and the second face 20b. This way, in the passage of the damping fluid 17 through the plurality of holes 33 made on each plug element 37, in particular during the forward stroke A, as shown in FIG. 3, is created a turbulent flow of the fluid to obtain a better damping coefficient. In other words, the effects of a laminar flow of the damping fluid 17 are limited in the passage from a chamber to the other that would reduce the dissipation of the damper.

In particular, the plurality of apertures 26 define an overall opening area at least double with respect to the overall opening area defined by the plurality of permanent holes 33, in particular the overall opening area of the apertures 26 is four times higher with respect to the overall opening area of permanent holes 33. This way, the substantial difference between the diameter of the apertures 26 and the diameter of permanent holes 33 allows a quick return of piston 20 towards the starting position at the BDP, since it allows a free passage of the damping fluid 17 between the first 21 and the second 22 chamber.

In particular, for adjusting the flow of damping fluid 17 and then the dissipation of damper 100, the through holes 33 are associated to further closure elements 34 (FIG. 4A) suitable for blocking one or more through holes 33. This way, closing selectively one or more of the through holes it is possible to adjust the damping rate and then to obtain more or less damping effectiveness. In detail, each plug element 37 comprises a frustum-conical portion 37a suitable for positively engage with a respective opening 26 so that the frustum-conical portion 37a penetrates partially within the opening 26 and does not allow the passage of the damping fluid 17 during the movement of piston 20.

Figure 4B:
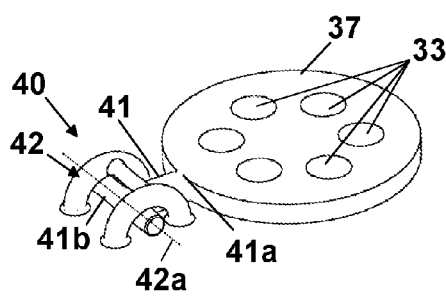
FIG. 4B shows an enlarged view of a possible embodiment of the connection means that allow to each plug element to pass from the open configuration to the closed configuration.

FIGS. 4A and 4B show, furthermore, an embodiment of the connection means 40 that comprises a connecting arm 41 having a first end 41a integral to plug element 37 and a second end 41b protruding from plug element 37. Furthermore, it provides a fastening element 42 (FIG. 4B) fixed on a face of piston 20 on which the second connection end 41b is pivotally connected. More in particular, the second connection end 41*b*, in the embodiment of FIG. 4B, is T-shaped and fastening element 42 defines a housing in which the second T-shaped end is inserted in order to allow the free rotation about an own axis 42*a*. Each plug element 37 is therefore capable of rotating spontaneously by a determined angle with respect to the first face 20*a* of the piston.

Figure 4C:
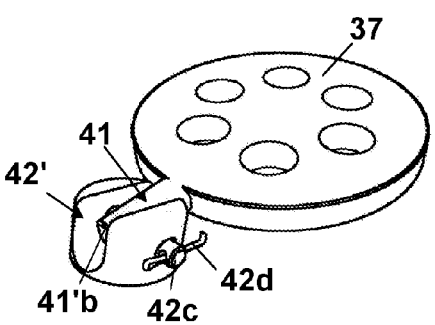
FIG. 4C shows an enlarged view of a further embodiment of the connection means in version that can be disassembled.

In a further embodiment, as shown in FIG. 4C, fastening element 42' provides a pin 42*c* blocked by means of a split pin 42*d*, which connects pivotally a second end 41'*b* of the arm 41 that has a hole of passage with which pin 42*c* engages. In this embodiment, each plug element 37 can be disassembled and exchanged.

In particular, a such a damper 100 can be used in a position selected among a vertical position, horizontal or inclined. This is not possible for the dampers of prior art.

In particular, in the horizontal position and in the inclined position each connection means 40 defines a hinge that is arranged superiorly with respect to the centre of gravity of a corresponding plug element, in particular the centre of gravity of the plug element is misaligned with respect to the hinge, in such a way that plug element 37 returns spontaneously to the closed configuration. This way, the closing movement of plug element 37 is triggered by a component of the weight force that arises from said misalignment between the centre of gravity and the hinge of the plug element on the piston.

In a preferred embodiment, as shown in FIG. 5, the damper comprises in combination with the spring, a magnetic element arranged on the bottom wall opposite to the plug elements, in such a way that when the piston is located substantially at the first dead point BDP, the magnetic element 90 generates an attraction on piston 20 and on the plug elements 37, inversely proportional to the square of the distance, which assists the passage of plug elements 37 to the closed configuration, whereas when piston 20 moves towards the second dead point TDP the magnet 90 contributes to damp the movement of piston 20. This way, the damper can be used in an overturned position since the closing operation of the plug elements is ensured by the magnetic element.

More in particular, in a way not shown, the damper can comprise, alternatively to spring 50, a first and a second magnetic elements arranged opposite to each other having polarity opposite to each other. In this case, the second magnet generates a repulsive force with respect to the first face of the piston, operating then in a way similar to spring 50.

Figure 6:
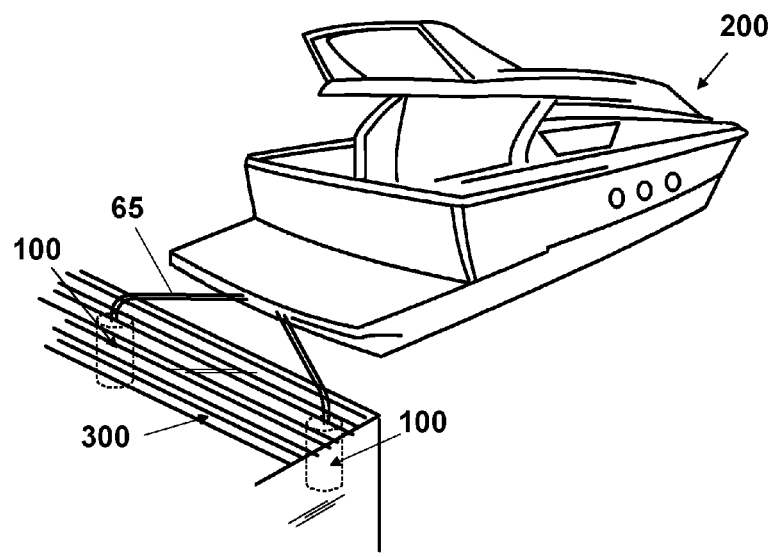
FIG. 6 shows a perspective view of a couple of dampers, according to the invention, for mooring a watercraft arranged on a wharf-sided mooring support of a harbour.
Figure 7:
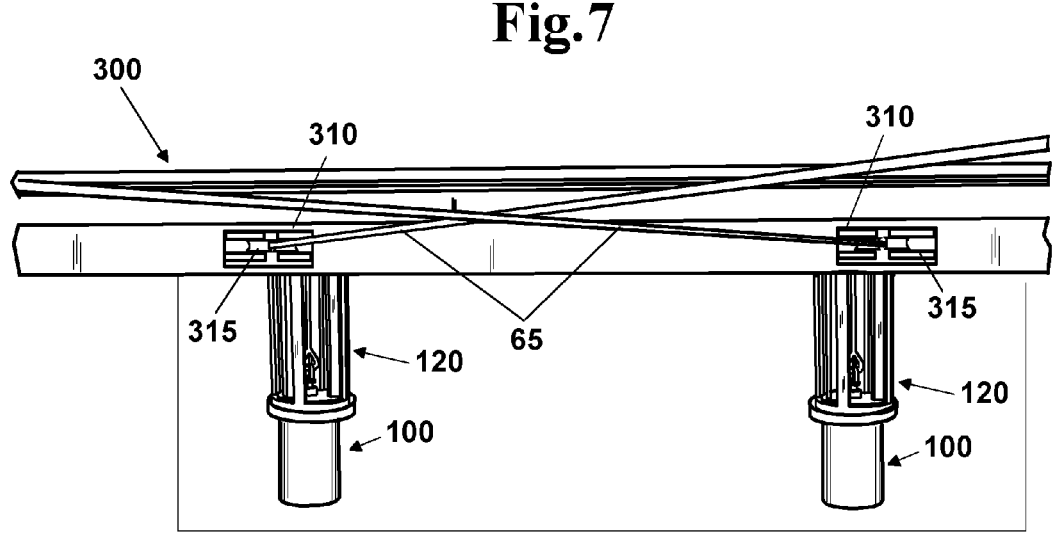
FIG. 7 shows an elevational front view of the wharf-sided mooring support of FIG. 7, which highlights the nested arrangement of the two hydraulic dampers.
Figure 8:
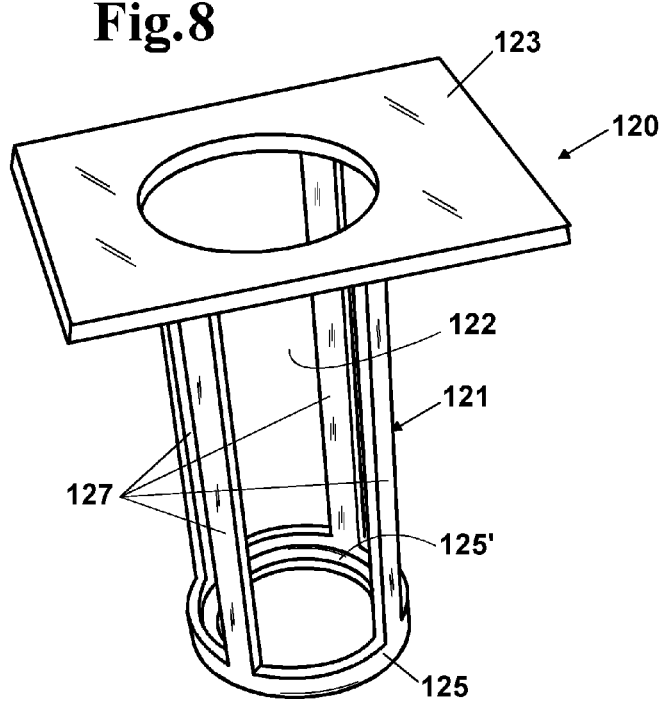
FIG. 8 shows a perspective view of a support frame arranged on the wharf of FIG. 7, suitable for receiving a respective damper.

In a preferred embodiment, as shown in FIGS. 6 and 7, two dampers 100 are provided and are arranged below a wharf-sided mooring support 300, each damper 100 is housed within a support frame 120 that defines a housing 122 (FIG. 8). In particular, as better shown in FIG. 7, each damper 100 that is arranged on the wharf-sided mooring support 300 is connected, through the external connection end 36, to a mooring 65 for damping the actions to which the wharf-sided mooring support 300 is subjected transmitted by mooring 65. Alternatively, support frame 120 of the damper is configured to be arranged directly on the watercraft and can contain a damper that is sized responsive to the size of the watercraft on which it is arranged. In this case, it is possible to reduce the overall costs of the damper since the used materials for the external parts must not have the same resistance to corrosion with respect to an application for outdoor appliances, in particular in contact with sea water.

Figure 9:
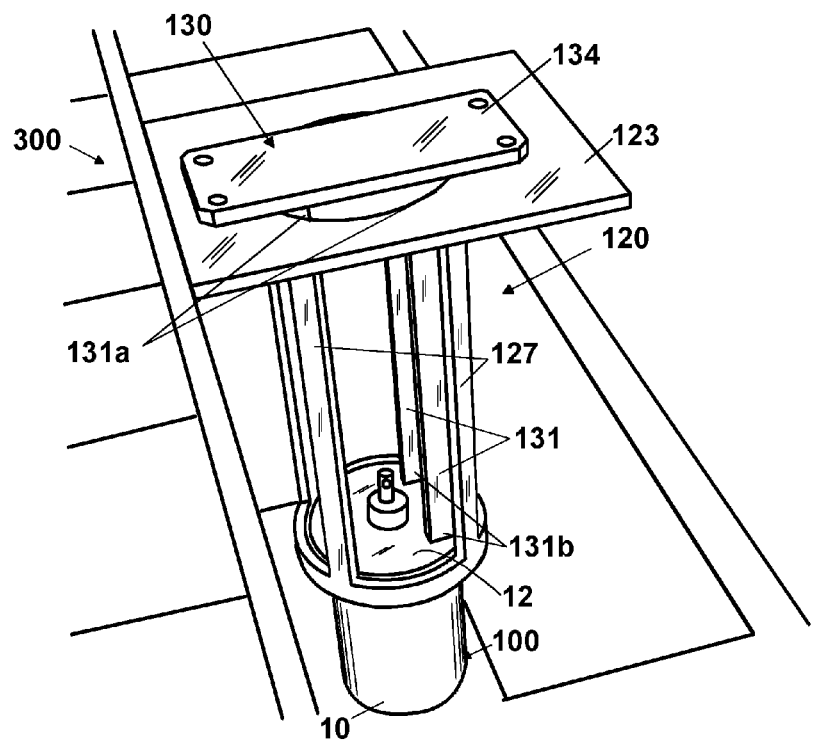
FIG. 9 shows a perspective view of a relative support fastening coupled to the support frame of FIG. 8, for keeping in steady position the hydraulic damper.

In more detail, as shown in FIG. 8, support frame 120 comprises a tubular support 121 equipped with a fastening portion 123 and a lower support ring 125, arranged opposite to fastening portion 123, suitable to define an abutment 125' for the head wall 12 of damper 100, the support ring 125 having a diameter substantially the same as the diameter of cylinder 10, but a diameter shorter than head wall 12. This way, damper 100, as shown in FIG. 9, is inserted in tubular support 121 until head wall 12 of cylinder 10 abuts against support ring 125. In particular, the tubular support 121 comprises a plurality of rods 127 rotationally spaced, in order to form substantially tubular housing 122. Fastening portion 123 is suitable to be connected integrally to the wharf-sided mooring support 300. Once inserted damper 100 a fixing means 130 is provided, as shown in FIG. 9, suitable for entering housing 122 to abut against head wall 12 of cylinder 10, in order to keep damper 100 in contact with support ring 125. Such solution allows easy disassembling the damper from the support frame for maintenance operations. In detail, the fastening means 130 comprise a plurality of rods 131 rotationally spaced from each other that define a tubular fastening structure 130 suitable to be arranged within the tubular support 120, each of the rods 131 has a first end 131*a* (FIG. 9A) connected to a fastening plate 134 and a second free end 131*b* suitable for contacting head wall 12 of cylinder 10, in such a way that when the tubular fastening structure is inserted within the tubular support 121 and the fastening plate 134 is solidly connected to the fastening portion, the rods 131 push on head wall 12 of the cylinder opposing to its movement, which is caused by the forces that act on the actuating end the shaft. In this case, the damper is arranged within the tubular support in a position substantially vertical. Alternatively, the damper is arranged within the tubular support 121 in a position horizontal.

Figure 9A:
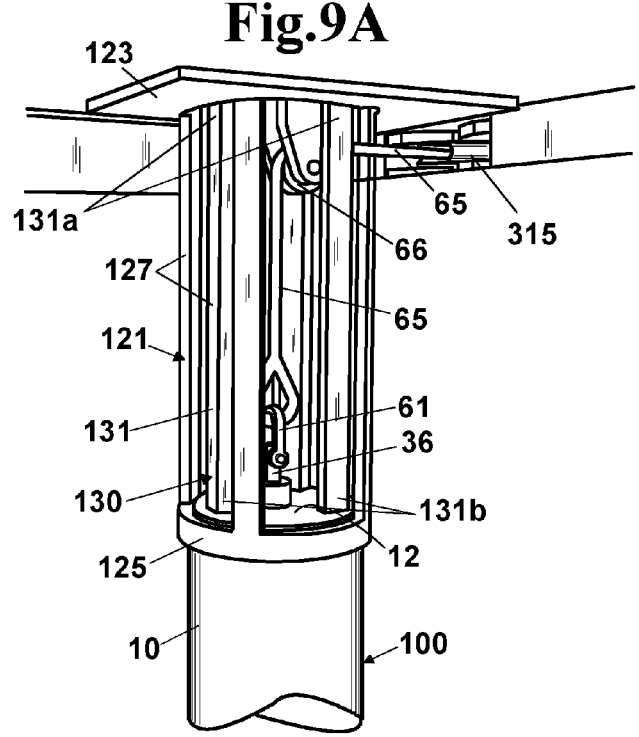
FIG. 9A shows in a perspective view the connection of a hydraulic damper, according to the invention, arranged in the support frame and equipped with a pulley mechanism for connection to a mooring means.

In particular, as shown in FIG. 9A, the fastening end 36 of shaft 25 is connected by means of for example a cricket 61, to an end of the mooring 65, by means of a pulley 66, to a respective opening passage 310 made on the wharf 300, better shown in FIG. 7. At each opening passage 310 further pulleys 315 are provided for orientation to the mooring 65 (FIG. 7).

Figure 11:
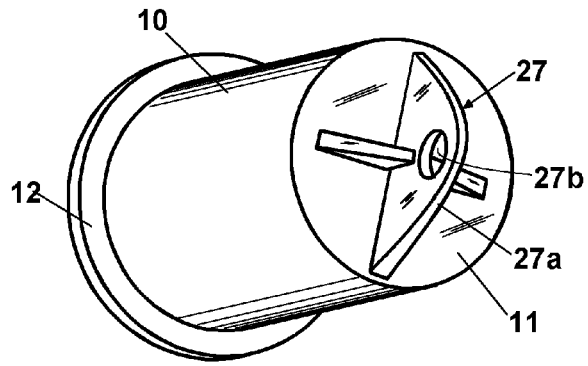
FIG. 11 shows a perspective view of a second connection end of the damper arranged on a bottom wall that allows the connection with a fastening element such as for example a mooring or a ballast, or even a part of a frame.

In a further application, as shown in FIG. 10, damper 100 is associated to a bow mooring of the watercraft 200 immersed in water anchored to the sea depth or at a floating wharf 320. In this case, as shown in FIG. 11, damper 100 provides a second connection end 27 integral to cylinder 10. In detail, on the bottom wall 11 of cylinder 10 a cross-like element 27*a* is arranged with a connection hole 27*b* to which it is possible to connect a ballast 350 resting on the sea depth or a further portion of the mooring 65.

Through second connection end 27, it is possible to connect the damper 100 between two anchoring elements, such as, for example for the nautical field, two moorings for a watercraft.

Figure 12:
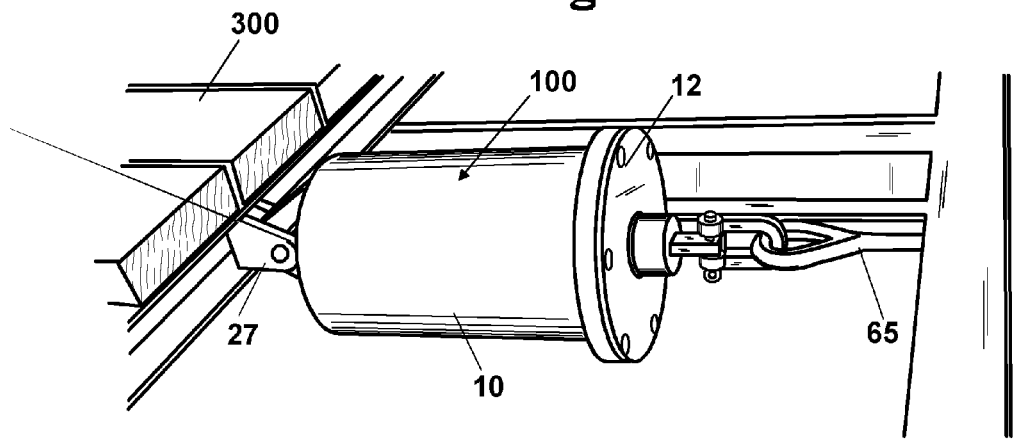
FIG. 12 shows in a perspective view the damper arranged on the wharf-sided mooring support of FIG. 7, arranged in a horizontal position and connected to the second connection end of FIG. 11.

Even alternatively, as shown in FIG. 12, damper 100 can be arranged in a horizontal position and connected to the wharf-sided mooring support 300 by second connection end 27.

Figure 13:
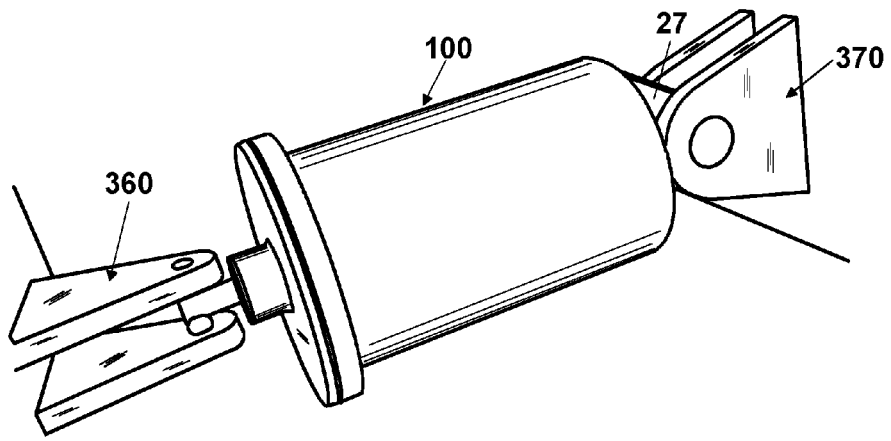
FIG. 13 shows in a perspective view the damper arranged between two opposite parts of a frame, for example of a car, for damping the dissipations given by the relative movements between the parts.

In a further application, as shown in FIG. 13, damper 100 can be arranged between two opposite parts 360 and 370 of a frame, for example of a car, for damping the relative movement between said parts.

In particular, the characteristic size of damper 100 is function of the specific application to which it is destined. For example, in the nautical field, the size of the damper and then its damping capacity, can be selected responsive to the size of the watercraft.

It is a further advantage of such a damper 100 that, due to same characteristics of the damping fluid 17, which can vary with the temperature, to adapt spontaneously to a higher damping coefficient in winter, when there are more frequent sea storms, and to reduce the damping coefficient in summer, in order to increase the comfort on the watercraft.

Figure 14:
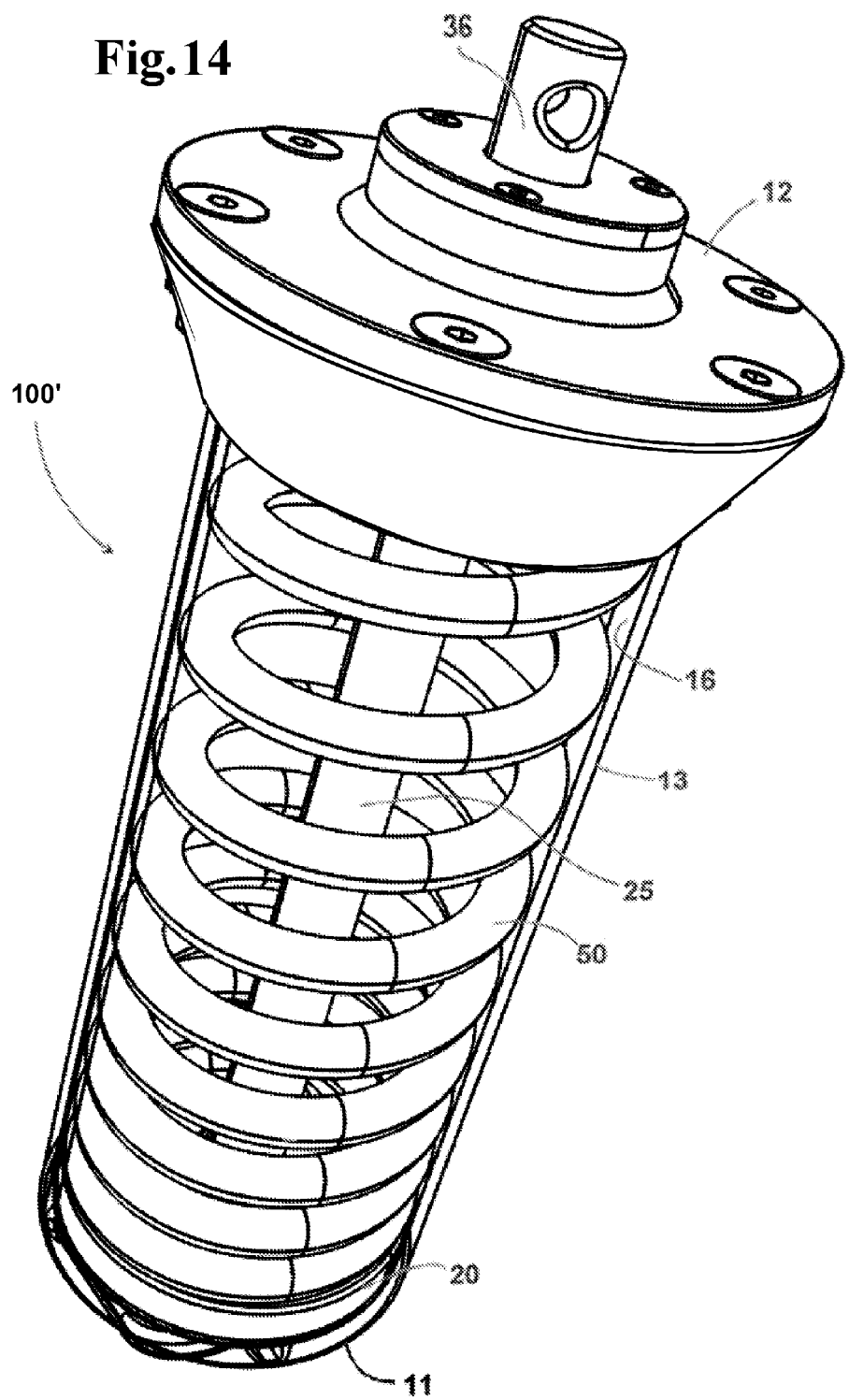
FIG. 14 shows a detail of a perspective view of a damper according to the invention with a spring having outer diameter equal to the inner diameter of the cylinder, in particular an adjustable pitch spring.

As shown in FIG. 14, in a possible embodiment of the damper 100', spring 50 has the outer diameter equal to the inner diameter of cylinder 13, in order to go in contact with the inner lateral surface of cylinder 13, and has ends that contact directly piston 20 and head wall 12 of the cylinder, or an interposition washer not shown.

In an advantageous embodiment, always as shown in FIG. 14, spring 50 is of adjustable pitch type. In this case, the stiffness of the spring is variable responsive to the elongation of the damper, with a growing absorbed load responsive to the elongation. This way, the hydraulic damping is effective also in case of low intensity and frequent loads. Obviously, solutions in which there is a spring 50 having outer diameter equal to the inner diameter of cylinder 13, but not with adjustable pitch, are also possible.

Figure 15:
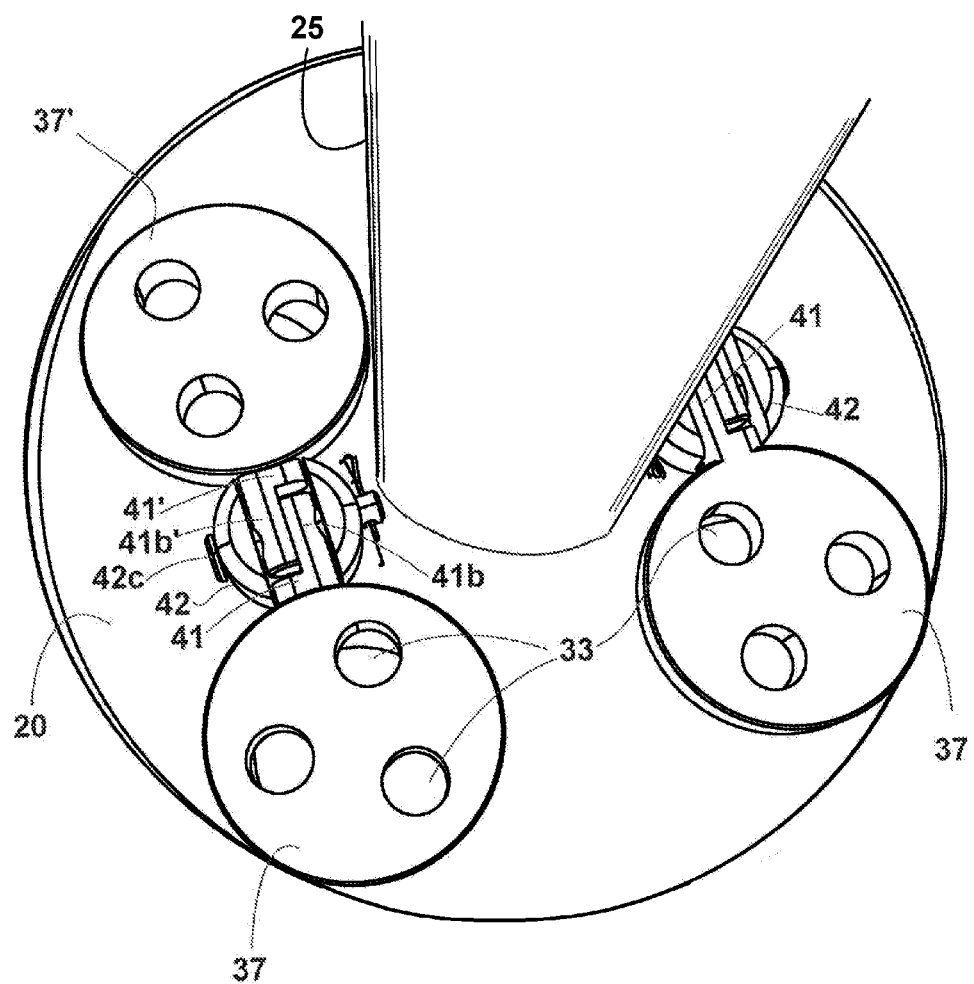
FIG. 15 shows a perspective view of an embodiment of the mechanism for hinging and fastening the plugs to the piston of the damper.

As shown in FIG. 15, in a further alternative embodiment, fastening element 42 is suitable for receiving second end 41b, 41b' for connection of the fastening elements 41, 41' of two opposite plug elements 37, 37'. In particular, said second end 41b, 41b' is L-shaped, so that the two connecting arms 41, 41' of two opposite plug elements are the same and rotate with respect to the pin 42c of fastening element 42. This way, the second end 41b, 41b' forms a longitudinal shaft portion that works as abutment against fastening element 42 to limit the rotation of each plug element 37, 37' not exceeding 90° of rotation starting from the closed position.

The arrangement of FIG. 15 shows the plugs 37, 37' that end radially close to the outer edge of the cylinder 20. In case of spring that rests on the inner lateral surface 16, visible in FIG. 14, obviously, the plugs 37, 37' will be more detached from the side of piston 20, in order to allow the support of spring 50 to piston 20.

Figure 16:
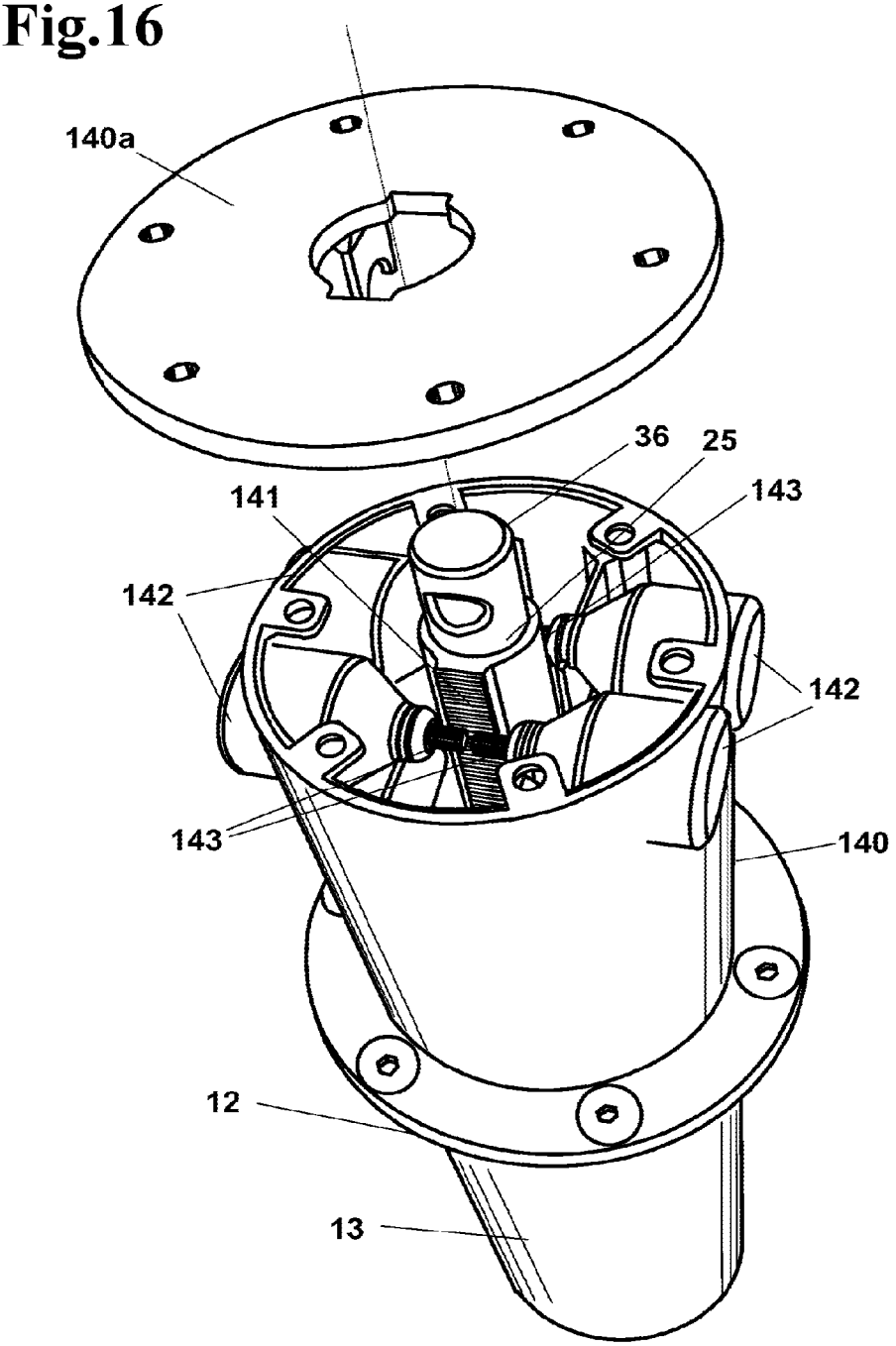
FIG. 16 shows a generator which can be fixed to the shaft of a damper according to the invention.
Figure 17:
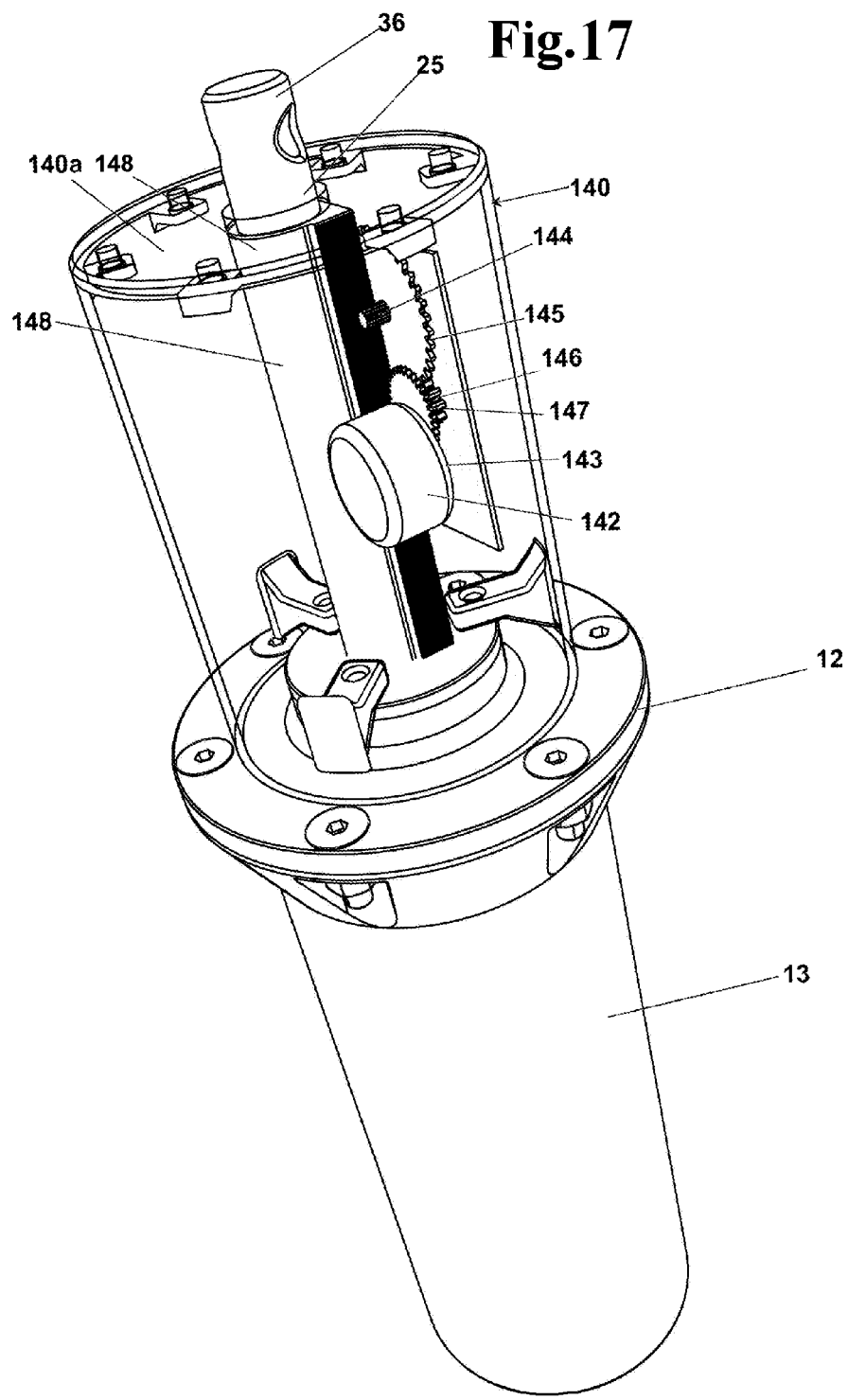
FIG. 17 shows an embodiment of a generator which can be fixed to the shaft of a damper according to the invention, with multiplication gear.
Figure 18:
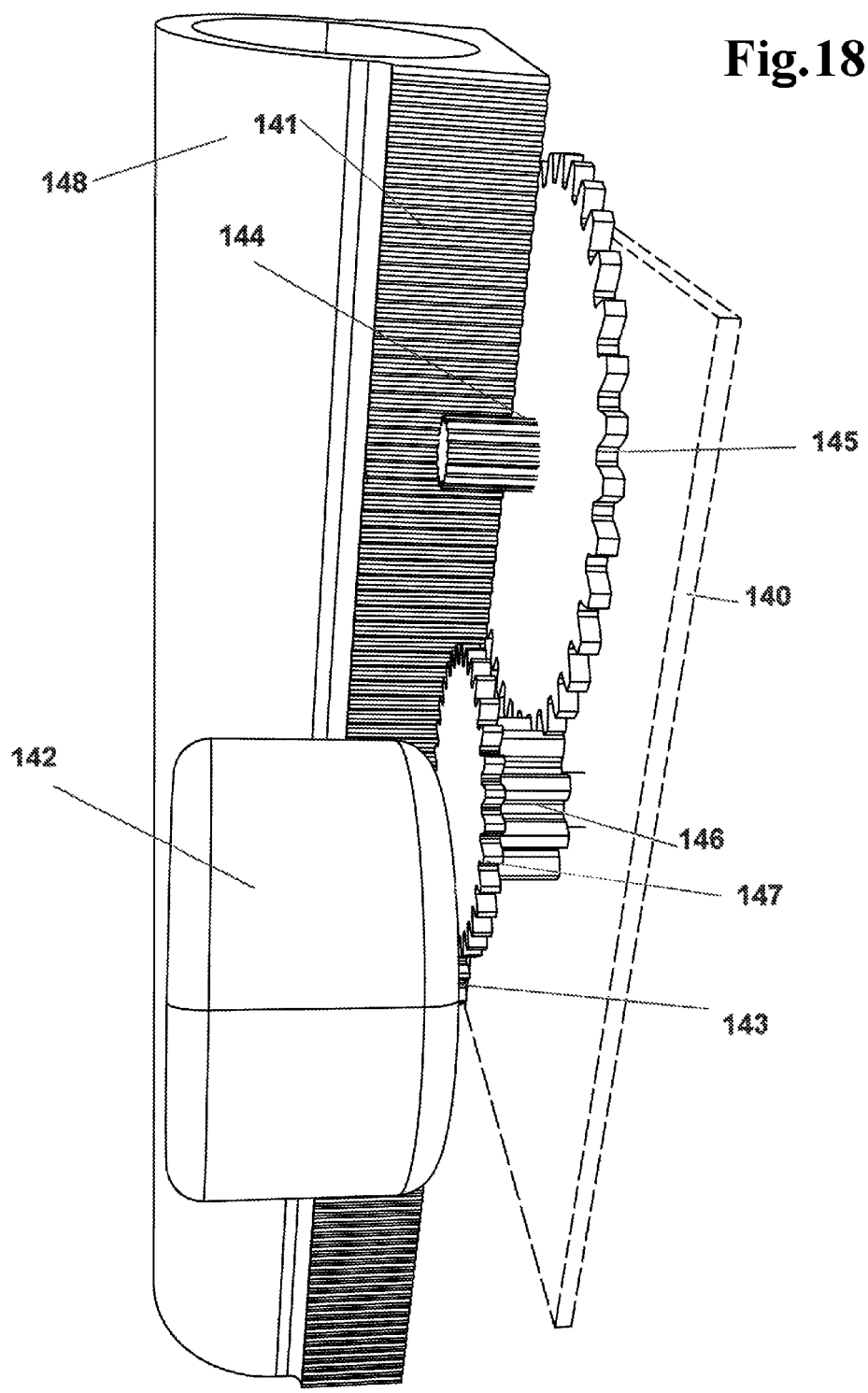
FIG. 18 shows a perspective view in detail of a rack with generator and multiplication gear which can be fixed to the shaft of a damper according to the invention.

With reference to FIGS. 16 to 18, according to another aspect of the invention, a hydraulic damper is shown comprising cylinder 13, in which piston 20 slides (non shown) biased by a spring (non shown) and having head wall 12 to which a block generator 140 is mounted, suitable for obtaining energy from the alternated movement of shaft 25 of the piston.

In this case, shaft 25 of piston 20 is made along from far si that its end 36 protrudes enough beyond the block generator 140.

In particular, the block generator comprises a rack 141, integral to shaft 25 in its portion that protrudes from head wall 12, and at least a generator 142, which has a pinion gear 143 that meshes on the rack 141. In particular, in FIG. 16 four electrical generators are shown, for example dynamo or alternators. The generator/s is/are mounted with the stator integral to the fixed part of block 140, which is integral to head wall 12. The block generator can be closed by a cover 140a and lubricated inside.

It is therefore possible to recover energy from the relative movement of shaft 25 of piston 20 with respect to cylinder 13. In particular, during the forward stroke of piston 20 that is close to head wall 12, a part of the energy is accumulated by spring 50, and a part is recovered by generator 140. During the return stroke of piston 20, the part of energy accumulated by spring 50 is completely recovered by the generator.

The cylinder can be both of the type above described, with plugs 37, or of different type with or without damping fluid.

With reference to FIGS. 17 and 18, between generator 142 and rack 141 a gearing 144-147 can be present that has the effect of multiplier of turns of the pinion gear 143. This way, even with small motion of the shaft 25, hundreds of turns/min can be transmitted to the pinion gear 143, and then to the axis of the generator 142. FIG. 18 shows rack 141 comprising a sleeve 148, that can be mounted to shaft 25 (FIG. 17).

This type of dampers with generator can be used in any of the ways shown above, not only in dampers that can be arranged between the mooring ropes, but also in dampers mounted at a wharf or pier, or in dampers installed on board of watercrafts.

The foregoing description of specific embodiments of the invention will so fully reveal the invention according to the conceptual point of view, so that others, by applying current knowledge, will be able to modify and/or adapt for various applications such embodiment without further research and without parting from the invention, and, accordingly, it is therefore to be understood that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:
1. A hydraulic damper (100) comprising:
a cylinder (10) having a bottom wall (11), a head wall (12) and a side wall that define a damping chamber (15) having an inner lateral surface (16);
a piston (20) having a first face (20a) and a second face (20b) opposite to each other, the piston being suitable for sliding within said damping chamber (15) along said inner lateral surface (16), in order to define a first chamber (21) and a second chamber (22) separate from each other, said piston (20) being suitable for carrying out a forward stroke (A) between a first dead point (BDP) at said bottom wall (11), towards a second dead point (TDP) at said head wall (12), and a back stroke (B) between said second dead point (TDP) and said first dead point (BDP);
a shaft (25) integral to said piston (20) that extends outside beyond said head wall (12) of said cylinder (10), in order to define an external connection end (36);
a damping fluid (17) contained in said damping chamber (15);
a plurality of permanent holes (33) suitable for permanently connecting said first chamber (21) to said second chamber (22), and allowing leakage of said damping fluid (17);
a plurality of apertures (26) that extend from said first face (20a) to said second face (20b) of said piston (20);
wherein said plurality of apertures (26) are associated to a plurality of plug elements (37) hingedly connected by connection elements (40) on said first face (20a) or on said second face (20b) of said piston (20), and are arranged in such a way that said plug elements (37) move spontaneously from a closed configuration (C), in which said apertures (26) are closed and allow the leakage of said damping fluid (17) between said first chamber (21) and said second chamber (22), only through said plurality of permanent holes (33), in order to dampen movement of said piston (20) towards said second dead point (TDP), to an open configuration (D), in which said apertures (26) are open to allow free passage of said fluid between said first chamber (21) and said second chamber (22), thereby assisting return movement towards said first dead point (BDP); and
wherein said connection elements (40) allow rotation of each plug element (37) according to a rotation axis (42a) parallel to the first face (20a) or the second face (20b) of said piston (20) and wherein each connection element (40) comprises:

a connecting arm (41) having a first connection end (41a) integral to said plug element (37), and a second connection end (41b) protruding from said plug element (37); and a fastening element (42) suitable for receiving said second connection end (41b).

2. A hydraulic damper (100), according to claim 1, wherein said plug elements (37) are arranged in a position selected among:

on said first face (20a), in order to keep said closed configuration (C) during said forward stroke (A), and pass to said open configuration (D) in said back stroke (B);

on said second face (20b), in order to keep said closed configuration (C) during said back stroke (B), and pass to said open configuration (D), in said forward stroke (A).

3. A hydraulic damper (100), according to claim 1, wherein said second connection end (41b) is T-shaped and said fastening element (42) defines a housing in which said second T-shaped end is inserted in order to allow the rotation; alternatively said second end (41b) has a hole in which a pin (42c) engages for the hinged connection to said fastening element (42).

4. A hydraulic damper (100), according to claim 1, wherein said permanent holes (33) are made in a position selected among: directly on said piston (20) and extending from said first face (20a) to said second face (20b); directly on, or on a part of, each of said plug elements (37); or a combination thereof.

5. A hydraulic damper (100), according to claim 1, wherein said damper (100) provides a spring (50) mounted to said shaft (25) suitable for assisting damping of movement of said piston (20) and to assist the back stroke of said piston (20) in said first dead point (BDP), wherein said spring (50) is mounted between a first cup-shaped element (51) and a second cup-shaped element (52) arranged opposite to each other, wherein said first cup-shaped element (51) is integral to said shaft (25) and said second cup-shaped element (52) is arranged freely at an end opposite to said spring (50) and is located between said spring (50) and said head wall (12) of the cylinder (10).

6. A hydraulic damper (100), according to claim 4, wherein in combination with said spring (50) a magnetic element (90) is arranged on said bottom wall (11) opposite to said plug elements (37), in such a way that when said piston (20) is located substantially at said first dead point (BDP), said magnetic element (90) generates an attraction on said piston (20) and on said plug elements (37) that assists passage of said plug elements (37) to the closed configuration (C), whereas when said piston (20) moves towards said second dead point (TDP) said magnetic element (90) also dampens movement of said piston (20), wherein said damper (100) comprises alternatively to said spring (50) a first magnetic element and a second magnetic element arranged opposite to each other having polarity opposite to each other.

7. A hydraulic damper (100), according to claim 1, wherein said plug elements (37) have a minimum thickness with respect to the thickness of said piston (20) defined between said first face (20a) and said second face (20b), wherein each plug element (37) comprises a frustum-conical portion (37a) suitable for engaging tightly with a respective opening (26) on the piston (20), so that said frustum-conical portion (37a) penetrates partially within said opening (26) and does not allow the free passage of the damping fluid (17) during movement of the piston (20) towards said second dead point (TDP), and wherein said permanent holes (33) are associated to further closure elements (34) suitable for blocking one or more permanent holes (33) for adjusting a flow of damping fluid (17), and thereby adjusting dissipation of the damper.

8. A hydraulic damper (100), according to claim 1, wherein said cylinder (10) comprises a first sealing means (80) arranged between an edge (13a) of said side wall (13) and said head wall (12), wherein said head wall (12) comprises, from a side that matches with said edge (13a) of the cylinder (10), wherein said head wall (12) further comprises a matching portion (12b) for matching with said shaft (25) and provides a second sealing means (85) arranged at said matching portion (12b), wherein said second sealing means (85) is located in a housing (12d) made within said matching portion (12b), said matching portion (12b) further providing a removable portion (12e) by which it is possible to access said housing (12d), in order to replace or repair said second sealing means (85).

9. A hydraulic damper (100) according to claim 8, wherein said head wall (12) comprises two concentrically arranged sealing elements (82).

10. A hydraulic damper (100), according to claim 1, wherein said damper is configured to be arranged on a wharf-sided mooring support (300) of a harbor or on a watercraft (200) to be connected, through said external connection end (36), to a mooring (65) for damping actions of the watercraft (200) or of the wharf-sided mooring support (300) transmitted to said mooring (65).

11. A hydraulic damper (100) according to claim 10, wherein said support frame (120) comprises: a tubular support (121) having a fastening portion (123) and a lower support ring (125) arranged opposite to said fastening portion (123), the lower support ring (125) defining an abutment (125') for the head wall (12) of said damper; a fastening element (130) arranged on said tubular support (121) for keeping said damper (100) in contact with said support ring (125).

12. A hydraulic damper (100), according to claim 10, wherein two dampers (100) are provided to be arranged below said wharf-sided mooring support (300).

13. A hydraulic damper (100), according to claim 10, wherein the damper (100) is housed within a support frame (120) that defines a housing (122).

14. A hydraulic damper (100), according to claim 1, wherein a generator unit (140) is further provided, the generator unit (140) further comprising:

a rack (141), integral to said shaft (25) outside of the head wall (12) of said cylinder (10); and a generator (142) of electrical energy, the generator (142) having a stator integral to a fixed portion of said generator unit (140), integral to said head wall (12), and a movable portion (143), suitable for engaging with said rack (141), and for causing an armature of said generator (142) to rotate (142) with respect to said stator.

15. A wharf-sided mooring support (300) for a watercraft (200) comprising a damper according to claim 1, wherein the damper is housed by a support frame (120), said support frame (120) comprising: a tubular support (121) having a fastening portion (123) and a lower support ring arranged opposite to said fastening portion (123) suitable to define an abutment (125') for the head wall (12) of said damper; a fastening element (130) arranged on said tubular support (121) for keeping said damper (100) integral to said support ring (125), wherein said fastening element (130) comprises a plurality of rods (131) rotationally spaced from each other that define a tubular fastening structure suitable to be arranged within said tubular support (121), each of said rods (131) having a first end (131a) connected to a fastening plate (134) and a second free end (131b) arranged to contact said head wall (12) of the cylinder (10), in such a way that when said tubular fastening structure is inserted within said tubular support (121) and said fastening plate (134) is solidly connected to said fastening portion (123) said rods (131) push on said head wall (12) of the cylinder (10) opposing to movement of said head wall, which is caused by forces that act on the actuating end (36) of the shaft (25).

\* \* \* \* \*